(12) United States Patent
Almog

(10) Patent No.: US 10,438,101 B2
(45) Date of Patent: Oct. 8, 2019

(54) SYSTEMS AND METHODS FOR ESTABLISHING A COMMUNICATION CHANNEL BASED ON A CODE

(71) Applicants: Eyal Almog, Tel-Aviv (IL); Jonathan Levy, Tel-Aviv (IL)

(72) Inventor: Eyal Almog, Tel-Aviv (IL)

(73) Assignees: Eyal ALMOG, Tel-Aviv (IL); Jonathan LEVY, Tel-Aviv (IL)

(*) Notice: Subject to any disclaimer, the term of this patent is extended or adjusted under 35 U.S.C. 154(b) by 0 days.

(21) Appl. No.: 15/947,886

(22) Filed: Apr. 9, 2018

(65) Prior Publication Data

US 2018/0293474 A1 Oct. 11, 2018

Related U.S. Application Data

(60) Provisional application No. 62/483,398, filed on Apr. 9, 2017.

(51) Int. Cl.

| | | |
|---|---|---|
| *G06K 19/06* | (2006.01) | |
| *A44C 5/00* | (2006.01) | |
| *A44C 9/00* | (2006.01) | |
| *A44C 15/00* | (2006.01) | |
| *G09C 5/00* | (2006.01) | |
| *G06F 16/955* | (2019.01) | |
| *H04L 9/08* | (2006.01) | |
| *H04N 21/61* | (2011.01) | |

(Continued)

(52) U.S. Cl.
CPC ...... *G06K 19/06037* (2013.01); *A44C 5/0092* (2013.01); *A44C 9/0053* (2013.01); *A44C 15/0055* (2013.01); *G06F 16/955* (2019.01); *G06K 19/06046* (2013.01); *G06K 19/06121* (2013.01); *G06K 19/06159* (2013.01); *G09C 5/00* (2013.01); *H04L 9/0819* (2013.01); *H04N 21/4223* (2013.01); *H04N 21/472* (2013.01); *H04N 21/6125* (2013.01)

(58) Field of Classification Search
CPC ....... G06K 19/06037; G06K 19/06046; G06K 19/06121; G06K 19/06159; G06F 17/30876; A44C 5/0092; A44C 15/0055; A44C 9/0053; H04N 21/4223; H04N 21/472; H04N 21/6125; H04L 9/0819
See application file for complete search history.

(56) References Cited

U.S. PATENT DOCUMENTS

2006/0196858 A1* 9/2006 Barron ................... A44C 17/00
219/121.69
2010/0264056 A1* 10/2010 Braunstein ........... A44C 11/002
206/575

(Continued)

*Primary Examiner* — Sonji N Johnson

(57) ABSTRACT

There is provided an adornment having a machine readable code integrated therein for establishing a communication channel over a network between a computing device and a server, the adornment comprising an adornment body sized and shaped for wearing on an appendage of a body of a human, wherein the machine readable code comprises a plurality of gems which are inlaid in the adornment body, wherein the machine readable code encodes an identifier for establishing the communication channel between a computing device imaging said plurality of gems and a remote data storage device storing at least one media content item designated for presentation on a display of the computing device.

20 Claims, 14 Drawing Sheets

(51) Int. Cl.
*H04N 21/4223* (2011.01)
*H04N 21/472* (2011.01)

(56) References Cited

U.S. PATENT DOCUMENTS

| | | | |
|---|---|---|---|
| 2012/0101830 A1* | 4/2012 | Dholakiya | G09F 3/00 |
| | | | 705/1.1 |
| 2014/0090950 A1* | 4/2014 | Johnson | G07D 11/0051 |
| | | | 194/344 |
| 2016/0232432 A1* | 8/2016 | Regev | G02B 21/0028 |
| 2017/0372328 A1* | 12/2017 | Vaysman | G06K 7/10722 |
| 2018/0075156 A1* | 3/2018 | Broselow | G06F 17/30879 |

* cited by examiner

FIG. 5F
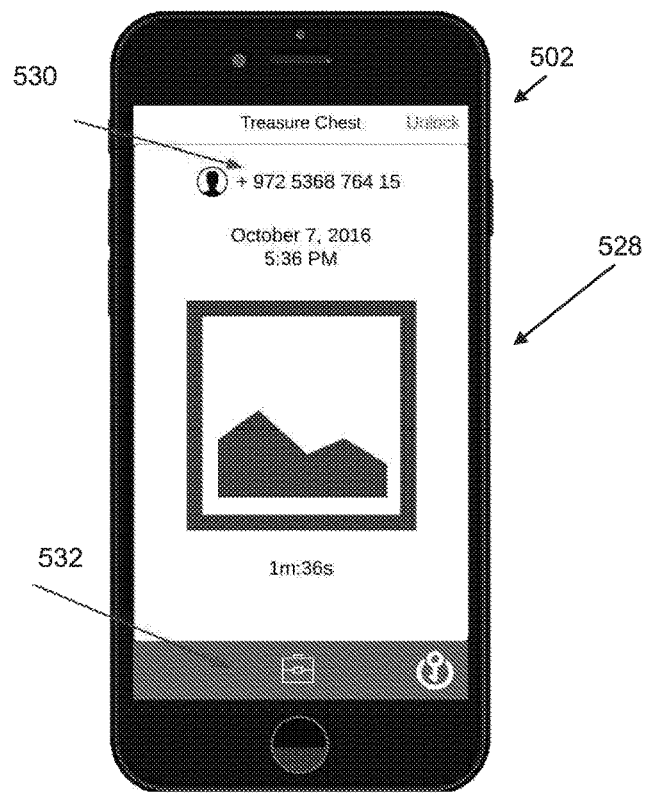
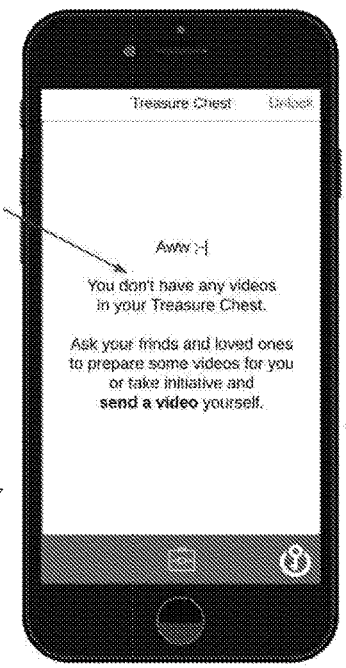
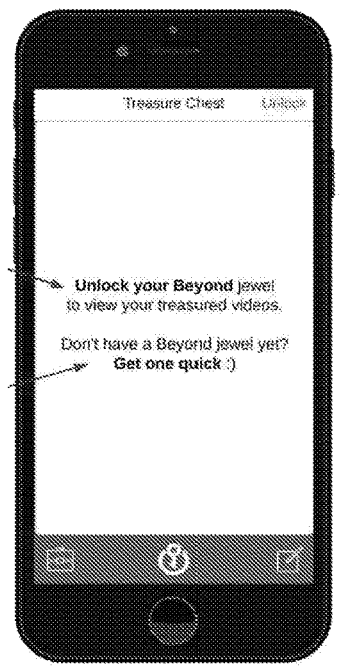
FIG. 5G  FIG. 5H

FIG. 5I
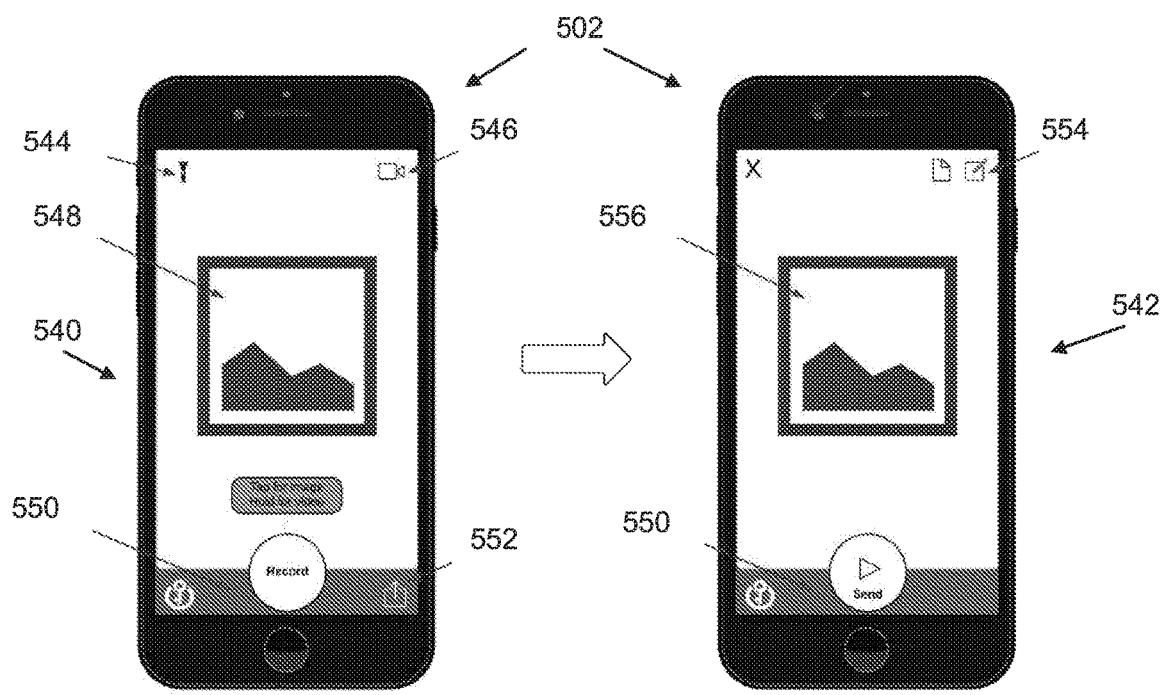
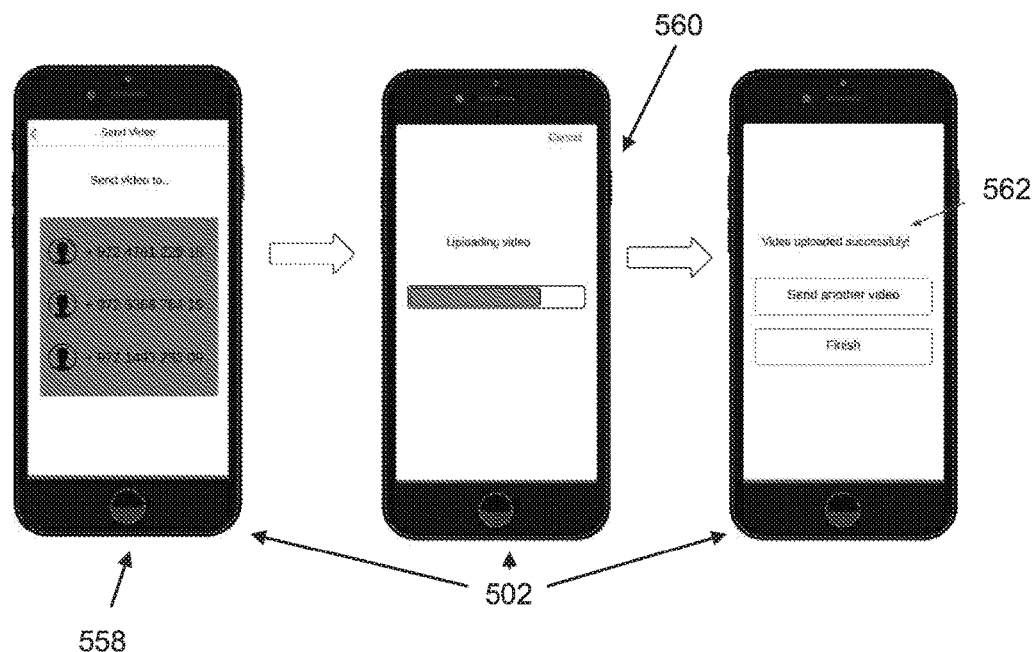
FIG. 5J

SYSTEMS AND METHODS FOR ESTABLISHING A COMMUNICATION CHANNEL BASED ON A CODE

RELATED APPLICATIONS

This application claims the benefit of priority under 35 USC § 119(e) of U.S. Provisional Patent Application No. 62/483,398 filed on Apr. 9, 2017. The contents of the above applications are all incorporated by reference as if fully set forth herein in their entirety.

FIELD AND BACKGROUND OF THE INVENTION

The present invention, in some embodiments thereof, relates to communication channels and, more specifically, but not exclusively, to methods and systems for establishing a communication channel over a network based on a code.

Bracelets with unique quick Response (QR) codes are used, for example to provide medical data and/or emergency data. When the QR code of the bracelet is scanned by a mobile device of a healthcare worker or emergency provider, a web site of the individual wearing the bracelet is presented on the display of the mobile device, which includes the medical and/or emergency data.

SUMMARY OF THE INVENTION

According to a first aspect, an adornment having a machine readable code integrated therein for establishing a communication channel over a network between a computing device and a server, the adornment comprising: an adornment body sized and shaped for wearing on an appendage of a body of a human, wherein the machine readable code comprises a plurality of gems which are inlaid in the adornment body, wherein the machine readable code encodes an identifier for establishing the communication channel between a computing device imaging said plurality of gems and a remote data storage device storing at least one media content item designated for presentation on a display of the computing device.

The code forms an ornamental pattern on the adornment. An onlooker may not necessarily distinguish the unique code from the rest of the ornamental design of the adornment, and/or may not recognize that the inlaying, engraving, and/or hallmark is a machine readable code. The code is integrated with the adornment rather than, for example, a sticker stuck on the adornment or ink printed on the surface of the adornment. The integration of the code with the adornment physically binds the code to the adornment, preventing loss of the code (e.g., sticker falling off) or damaging the code (e.g., rubbing off of printed ink) and preserving the ability of the code to establish the communication channel.

The adornment having the code integrated therein, and the systems and/or methods and/or code instructions described herein, address the technical problem of linking virtual digital items to a physical adornment item and facilitating providing a response to viewing of the digital item. In particular, the problem relates to a durable link that is resistant to wear and tear, regular use, and does not degrade over time. For example, linking a memory of a sending user captured by creating a video or image using a camera to an adornment provided to a receiving user, and providing the reaction of the receiving user to the sending user. When the video or image is stored on a storage device, the video or image may become forgotten, or become difficult to locate. When the image is physically printed, the printed image may become damaged, lost, or fade over time. A sticker stuck to the physical item with an indication of the memory may fall off. Ink printed on the physical item with an indication of the memory may smudge and/or rub off. Moreover, the problem relates to providing a link, in which only the designated person when in possession of the adornment item is able to retrieve the digital item.

The systems and/or methods and/or code instructions described herein are different than available bracelets with QR codes. Such QR code bracelets are designed to provide data of the individual wearing the bracelet during an emergency, such as a medical emergency, for example, allergies, known medical conditions, and medications. The data may be accessed by any user with a mobile device. In contrast the adornment provided herein includes a code that visually blends with the adornment. The code may be inlaid with precious stones and/or metal, and may not be necessarily identified as a code by a visual onlooker. The communication channel established based on the code automatically loads designated media content items, and transmits a response media content item(s). The establishment of the communication channel is defined according to set-of-rules provided by the sending user, for example, which receiving user is authorized to establish the communication channel, the media content item(s) that are transmitted, geographical location conditions, time based conditions, and proximity conditions.

In a first possible implementation form of the adornment according to the first aspect, the plurality of gems are precious stones selected from a group consisting of: diamond, ruby, sapphire, emerald, crystal, and synthetic material simulating a precious stone.

In a second possible implementation form of the adornment according to the first aspect as such or according to any of the preceding implementation forms of the first aspect, the plurality of gems are precious metals selected from a group consisting of: yellow gold, white gold, red gold, platinum, and silver.

In a third possible implementation form of the adornment according to the first aspect as such or according to any of the preceding implementation forms of the first aspect, each instance of the adornment includes a unique inlaid pattern of the plurality of gems forming a code unique to the instance of the adornment.

In a fourth possible implementation form of the adornment according to the first aspect as such or according to any of the preceding implementation forms of the first aspect, the adornment body includes at least two portions designed to connect with one another, wherein each of the at least two portions includes a part of the machine readable code such that the machine readable code encodes the identifier when the at least two portions are connected.

In a fifth possible implementation form of the adornment according to the first aspect as such or according to any of the preceding implementation forms of the first aspect, the machine readable code is encoded according to colors of the plurality of gems.

In a sixth possible implementation form of the adornment according to the first aspect as such or according to any of the preceding implementation forms of the first aspect, the machine readable code is encoded according to shapes of the plurality of gems.

In a seventh possible implementation form of the adornment according to the first aspect as such or according to any of the preceding implementation forms of the first aspect, the adornment comprises a jewelry item selected from the group consisting of: earring, necklace, bracelet, anklet, and ring.

According to a second aspect, an adornment having a machine readable code integrated therein for establishing a communication channel over a network between a computing device and a server, comprises: an adornment body sized and shaped for wearing on an appendage of a body of a human, wherein the machine readable code comprises an engraved pattern in the adornment body, wherein the machine readable code encodes an identifier for establishing the communication channel between a computing device imaging said engraved pattern and a remote data storage device storing at least one media content item designated for presentation on a display of the computing device.

In a first possible implementation form of the adornment according to the second aspect, the engraved pattern comprises an ornamental pattern.

In a second possible implementation form of the adornment according to the second aspect as such or according to any of the preceding implementation forms of the second aspect, the engraved pattern does not conform to a Quick Response (QR) code format.

In a third possible implementation form of the adornment according to the second aspect as such or according to any of the preceding implementation forms of the second aspect, the engraved pattern is a hallmark applied using a punching process or a laser marking process.

According to a third aspect, a system for establishing a communication channel between a computing device and a server storing at least one media content item over a network according to a code integrated with an adornment, comprising: a non-transitory memory having stored thereon a code for execution by at least one hardware processor of a computing device associated with a camera, the code comprising: code to capture an image of the code integrated with the adornment sized and shaped for wearing on an appendage of a body of a human, wherein the code encodes an identifier, code to establish a communication channel between the computing device and the server over the network according to the identifier, code to access at least one media content item mapped to the identifier, wherein the at least one media content item is received from the server via the communication channel and presented on a display of the computing device, and code to present a graphical user interface (GUI) on the display of the computing device that facilitates providing a response to viewing of the presented at least one media content item.

The communication channel establishes a mapping between media content item(s) and the adornment and provides a GUI for responding to the media content item(s), linking virtual item(s) and a response to the virtual item(s) to a certain physical item, in particular to a physical item that is worn by a human and represents a cherished and/or beautiful object. For example, a memory captured as a video is linked to a bracelet bought for a wedding anniversary and the GUI facilitates providing a response to the bracelet.

The adornment with code, the systems, the methods, and/or the code instructions described herein improve an underlying process within the technical field of network security. The code of the adornment establishes a communication channel between a computing device that captures the image of the code and a server. The code, which is physically integrated with the adornment, acts as a key to establishing the communication channel, thereby limiting establishment of the channel to the user in possession of the adornment with the code.

In a first possible implementation form of the system according to the third aspect, the at least one media content item is automatically transmitted from the server to the computing device via the established communication channel, and automatically presented on the display on the computing device substantially immediately upon imaging of the code, without additional input from the receiving user of the computing device.

In a second possible implementation form of the system according to the third aspect as such or according to any of the preceding implementation forms of the third aspect, the at least one media content item includes a video that is automatically streamed from the server via the established communication channel and automatically played on the display of the computing device substantially immediately upon imaging of the code, without additional input from the receiving user of the computing device.

In a third possible implementation form of the system according to the third aspect as such or according to any of the preceding implementation forms of the third aspect, the code denotes a decryption key for decrypting data transmitted over the network from the server to the computing device via the communication channel.

Decryption of the media content items is linked to the physical adornment item, which may improve security of the communication channel. Decryption of the media content item is based on physical possession of the adornment. The decryption key cannot be obtained by remote methods such as hacking.

In a fourth possible implementation form of the system according to the third aspect as such or according to any of the preceding implementation forms of the third aspect, the code denotes an encryption key for encrypting data transmitted from the computing device to the server via the communication channel.

In a fifth possible implementation form of the system according to the third aspect as such or according to any of the preceding implementation forms of the third aspect, the code denotes a network address for accessing the server by the computing device.

Access to the network address is based on physical possession of the adornment.

In a sixth possible implementation form of the system according to the third aspect as such or according to any of the preceding implementation forms of the third aspect, the GUI facilitates a chat session between the computing device and a client terminal mapped to the identifier.

In a seventh possible implementation form of the system according to the third aspect as such or according to any of the preceding implementation forms of the third aspect, the code is automatically generated by a security server in response to at least one of: selection of a certain adornment, and definition of the communication channel, and wherein the automatically generated code is integrated with the selected certain adornment by an automated integration machine.

In an eighth possible implementation form of the system according to the third aspect as such or according to any of the preceding implementation forms of the third aspect, the GUI facilitates capture of at least one image by a second camera associated with the computing device, wherein the second camera is positioned for capturing the face of a user capturing the image of the code with the camera associated with the computing device, and wherein the response comprises transmitting the at least one image captured by the second camera to the server over the established communication channel.

The second camera captures the reaction of the user receiving the adornment and/or the reaction of the receiving user viewing the content item(s).

In a ninth possible implementation form of the system according to the third aspect as such or according to any of the preceding implementation forms of the third aspect, the at least one media content item is at least one of: modifiable, removable, and added, by a client terminal of a sending user that defines the establishment of the communication channel.

In a tenth possible implementation form of the system according to the third aspect as such or according to any of the preceding implementation forms of the third aspect, a certain recipient user is mapped to the identifier by a client terminal of a sending user that defines the establishment of the communication channel, and wherein access is granted to the at least one media content item when the certain recipient user is validated according to credentials entered using the GUI.

In an eleventh possible implementation form of the system according to the third aspect as such or according to any of the preceding implementation forms of the third aspect, the code instructions are accessed by the computing device from the server according to a link transmitted to the computing device by a client terminal of a sending user that defines the establishment of the communication channel.

In a twelfth possible implementation form of the system according to the third aspect as such or according to any of the preceding implementation forms of the third aspect, access to the at least one media content item is granted when an authorization is received from a client terminal of a sending user that defines the establishment of the communication channel.

In a thirteenth possible implementation form of the system according to the third aspect as such or according to any of the preceding implementation forms of the third aspect, access to the at least one media content item is granted when a current date is according to a date requirement defined by a client terminal of a sending user that defines the establishment of the communication channel.

In a fourteenth possible implementation form of the system according to the third aspect as such or according to any of the preceding implementation forms of the third aspect, access to the at least one media content item is granted when a geographical location of the computing device is according to a geographical location requirement defined by a client terminal of a sending user that defines the establishment of the communication channel.

In a fifteenth possible implementation form of the system according to the third aspect as such or according to any of the preceding implementation forms of the third aspect, access to the at least one media content item is granted when the computing device is in proximity to another designated computing device defined by a client terminal of a sending user that defines the establishment of the communication channel.

According to a fourth aspect, a method for establishing a communication channel between a computing device and a server over a network based on a code integrated with an adornment, comprises: providing, by a client terminal of a sending user, at least one media content item for storage of a network connected server, associating the at least one media content item with an identifier encoded by the code integrated with an adornment body sized and shaped for wearing on an appendage of a body of a human, imaging the code with a computing device, establishing according to the identifier, a communication channel between the computing device and the server, presenting the at least one media content item on a display associated with the computing device, wherein the at least one media content item is transmitted from the server to the computing device over the communication channel, and providing a response to viewing of the presented at least one media content item, from the computing device to the client terminal of the sending user.

In a first possible implementation form of the method according to the fourth aspect, the method further comprises selecting the adornment from a plurality of adornments each including a body for integration of the code, generating a unique version of the code for the selected adornment, and at least one of: inlaying using a plurality of gems, engraving, and hallmarking the generated code within the body of the selected adornment.

In a second possible implementation form of the method according to the fourth aspect as such or according to any of the preceding implementation forms of the fourth aspect, the method further comprises: selecting the adornment from a plurality of adornments each including a respective pre-set code, wherein the associating of the at least one media content item is performed with the code of the selected adornment.

In a third possible implementation form of the method according to the fourth aspect as such or according to any of the preceding implementation forms of the fourth aspect, the method further comprises: defining by the client terminal of the sending user, a set-of-rules for establishment of the communication channel for presentation of the at least one media content item on the display.

In a fourth possible implementation form of the method according to the third possible implementation form, the set-of-rules for establishment of the communication channel for presentation of the at least one media content item on the display include one or more members selected from the group consisting of: authorization of a receiving user, authorization of the computing device, a future date, a geographical location condition of the computing device, a time based condition, and a proximity of the computing device to another defined computing device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-5K are schematic of various GUIs of a mobile device running the application for establishing the communication channel based on the code integrated with the adornment, in accordance with some embodiments of the present invention;

DESCRIPTION OF SPECIFIC EMBODIMENTS OF THE INVENTION

Figure 1:
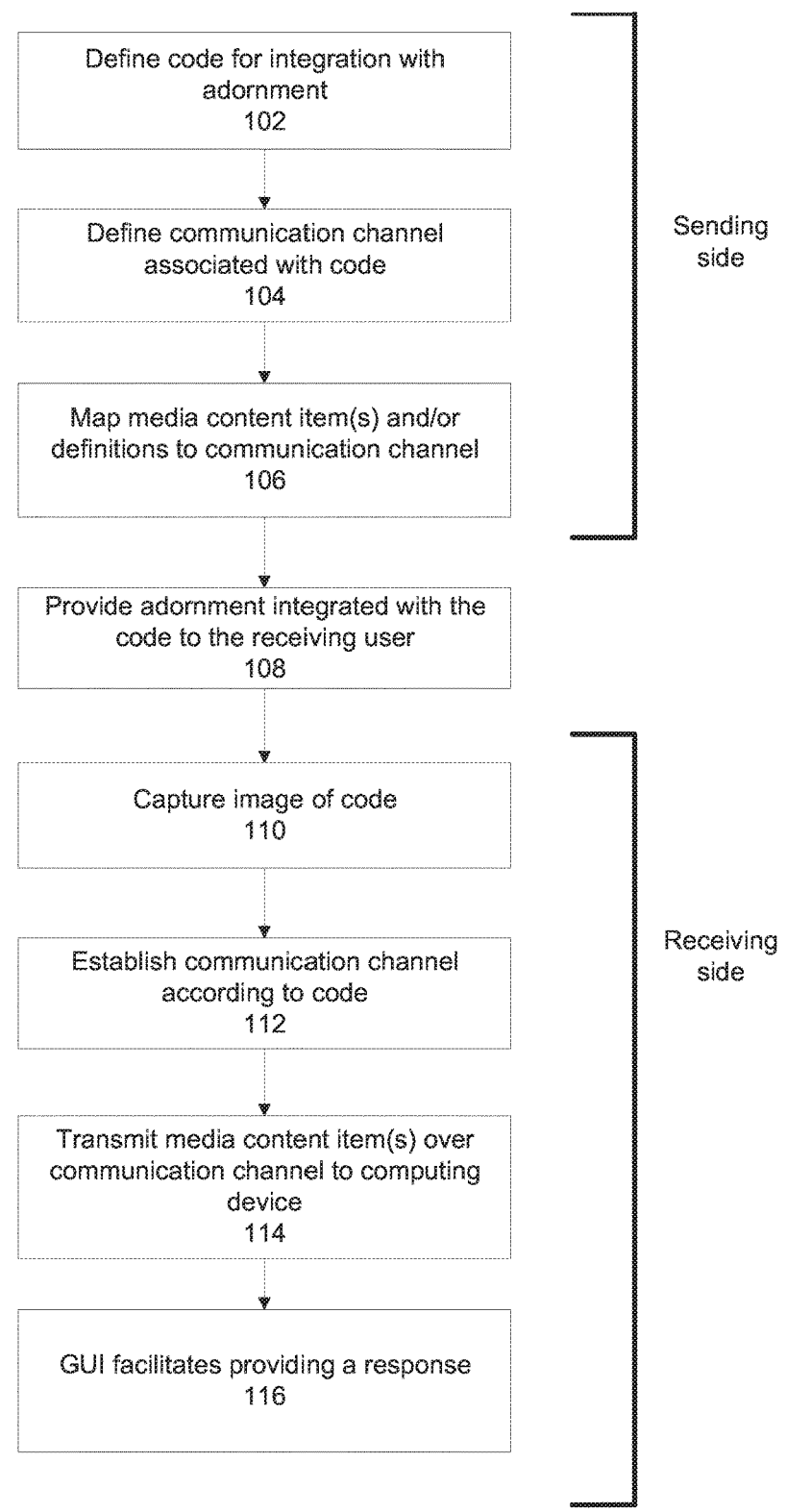
FIG. 1 is a flowchart of a process of establishing a communication channel over a network between a receiver side and a sending side based on a code integrated within an adornment, in accordance with some embodiments of the present invention.

The present invention, in some embodiments thereof, relates to communication channels and, more specifically, but not exclusively, to methods and systems for establishing a communication channel over a network based on a code.

An aspect of some embodiments of the present invention relates to an adornment that has integrated therein a machine readable code that encodes an identifier for establishing a communication channel over a network. The communication channel cannot be established without physical access to the adornment. The adornment, optionally an item of jewelry, is sized and shaped for wearing on an appendage of a body of a human, for example, on the head (e.g., headband), around the neck (e.g., necklace), at the ear (e.g., earring), around the wrist (e.g., bracelet), on a finger (e.g., ring), and on a toe (e.g., toe-ring). The code is integrated as a pattern and/or symbol on the adornment, such that the code is irremovable from the adornment without physically damaging the adornment. The code may be inlaid (e.g., as gems, such as diamonds, or mimics of gems such as quartz), engraved, and/or applied as a hallmark (i.e., stamped or laser applied). The code does not conform to the Quick Response (QR) code format. The code forms an ornamental pattern on the adornment. An onlooker may not necessarily distinguish the unique code from the rest of the ornamental design of the adornment, and/or may not recognize that the inlaying, engraving, and/or hallmark is a machine readable code. The code is integrated with the adornment rather than, for example, a sticker stuck on the adornment or ink printed on the surface of the adornment. The integration of the code with the adornment physically binds the code to the adornment, preventing loss of the code (e.g., sticker falling off) or damaging the code (e.g., rubbing off of printed ink) and preserving the ability of the code to establish the communication channel.

Optionally, the code is generated by a security server in response to code instructions received from a client terminal that defines the communication channel, for example, by generating the code that is mapped to media content item(s) provided by the client terminal. The code may be generated, for example, as a decryption (and/or encryption) key by cryptographic code executing on the security server. The code acts as the decryption key for decrypting data transmitted over the communication channel, for example, decrypting the media content item provided by the client terminal. The code is applied to a selected adornment in a customized manner. Alternatively, each adornment includes a respective pre-set code. The server maps the pre-set code of the selected adornment to the defined secure communication channel.

An aspect of some embodiments of the present invention relates to systems and/or methods and/or code instructions (stored in a data storage device, executable by one or more hardware processors) for establishing a communication channel across a network based on an identified encoded by the machine readable code integrated with the adornment. The communication channel is established between a computing device that images the machine code (e.g., captures an image of the code using a camera), and a server. Media content items (e.g., movies, images, text messages) provided by a client terminal and stored on the server are accessed by the computing device over the communication channel. The media content item(s) are optionally automatically presented on a display of the computing device. The automatic presentation may be performed substantially immediately upon imaging of the code (accounting for processing and/or network delays). The automatic presentation is performed in response to imaging of the code, without necessarily requiring additional input from the receiving user. The automatic presentation may include automatic streaming of a video from the server to the computing device over the established communication channel. A graphical user interface (GUI) is presented on the display of the computing device. The GUI facilities providing a response to the viewing of the presented media content item(s), for example, a chat session, an image of the receiving user viewing the presented media content item(s), a text message, and an audio recording. The response may be stored on the server and/or transmitted to the client terminal of the sending user that defines the communication channel.

The communication channel establishes a mapping between media content item(s) and the adornment and provides a GUI for responding to the media content item(s), linking virtual item(s) and a response to the virtual item(s) to a certain physical item, in particular to a physical item that is worn by a human and represents a cherished and/or beautiful object. For example, a memory captured as a video is linked to a bracelet bought for a wedding anniversary and the GUI facilitates providing a response to the bracelet.

Optionally, the code acts as a decryption key for decrypting encrypted media content items transmitted over the network from the server to the computing device via the communication channel. Decryption of the media content items is linked to the physical adornment item, which may improve security of the communication channel. Decryption of the media content item is based on physical possession of the adornment. The decryption key cannot be obtained by remote methods such as hacking.

Alternatively or additionally, the identifier encoded by the code denotes a network address for accessing the server by the computing device. Access to the network address is based on physical possession of the adornment.

Optionally, the response facilitated by the GUI includes a chat session between the computing device and a client terminal mapped to the code. The server may establish the chat session according to the code, for example, to the client terminal of the sending user that defined the communication channel.

Alternatively or additionally, the response facilitated by the GUI includes capturing an image(s) of at least the face of the receiving user with optionally a second camera of the computing device that faces the receiving user imaging the code using a first camera of the computing device. The second camera captures the reaction of the user receiving the adornment and/or the reaction of the receiving user viewing the content item(s).

The session may be established when one or more rules defined by a set-of-rules is met, and/or the media content item(s) are automatically presented when the one or more rules of the set-of-rules is met. The set-of-rules may be defined by the sending user accessing the server with the client terminal. Exemplary rules include: authorization of a receiving user, authorization of the computing device, a future date, a geographical location condition of the computing device, a time based condition, and a proximity of the computing device to another defined computing device.

The adornment having the code integrated therein, and the systems and/or methods and/or code instructions described herein, address the technical problem of linking virtual digital items to a physical adornment item and facilitating providing a response to viewing of the digital item. In particular, the problem relates to a durable link that is resistant to wear and tear, regular use, and does not degrade over time. For example, linking a memory of a sending user captured by creating a video or image using a camera to an adornment provided to a receiving user, and providing the reaction of the receiving user to the sending user. When the video or image is stored on a storage device, the video or image may become forgotten, or become difficult to locate. When the image is physically printed, the printed image may become damaged, lost, or fade over time. A sticker stuck to the physical item with an indication of the memory may fall off. Ink printed on the physical item with an indication of the memory may smudge and/or rub off. Moreover, the problem relates to providing a link, in which only the designated person when in possession of the adornment item is able to retrieve the digital item.

The adornment with code, the systems, the methods, and/or the code instructions described herein improve an underlying process within the technical field of network security. The code of the adornment establishes a communication channel between a computing device that captures the image of the code and a server. The code, which is physically integrated with the adornment, acts as a key to establishing the communication channel, thereby limiting establishment of the channel to the user in possession of the adornment with the code.

The systems and/or method and/or code instructions described herein do not simply describe the computation of a code using a mathematical operation and receiving and storing data, but combine the acts of imaging a machine readable code encoding an indicator physically integrated within an adornment, establishing a communication channel based on the indicator, optionally encrypting and/or decrypting data transmitted over the communication with the code acting as a key, and providing a GUI that facilitates providing a response of the receiving user to the sending user. By this, the systems and/or methods and/or code instructions described here go beyond the mere concept of simply retrieving and combining data using a computer.

The systems and/or methods and/or code instructions described herein are tied to physical real-life components, including one or more of: an adornment having a code integrated therein, a camera, physical user interfaces (e.g., display, keyboard, touchscreen), a data storage device storing media content items, and a hardware processor that executes code instructions.

The systems and/or methods and/or code instructions described herein are different than available bracelets with QR codes. Such QR code bracelets are designed to provide data of the individual wearing the bracelet during an emergency, such as a medical emergency, for example, allergies, known medical conditions, and medications. The data may be accessed by any user with a mobile device. In contrast the adornment provided herein includes a code that visually blends with the adornment. The code may be inlaid with precious stones and/or metal, and may not be necessarily identified as a code by a visual onlooker. The communication channel established based on the code automatically loads designated media content items, and transmits a response media content item(s). The establishment of the communication channel is defined according to set-of-rules provided by the sending user, for example, which receiving user is authorized to establish the communication channel, the media content item(s) that are transmitted, geographical location conditions, time based conditions, and proximity conditions.

Accordingly, the systems and/or methods and/or code instructions described herein are inextricably tied to computing technology and/or network technology to overcome an actual technical problem arising in communication networks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
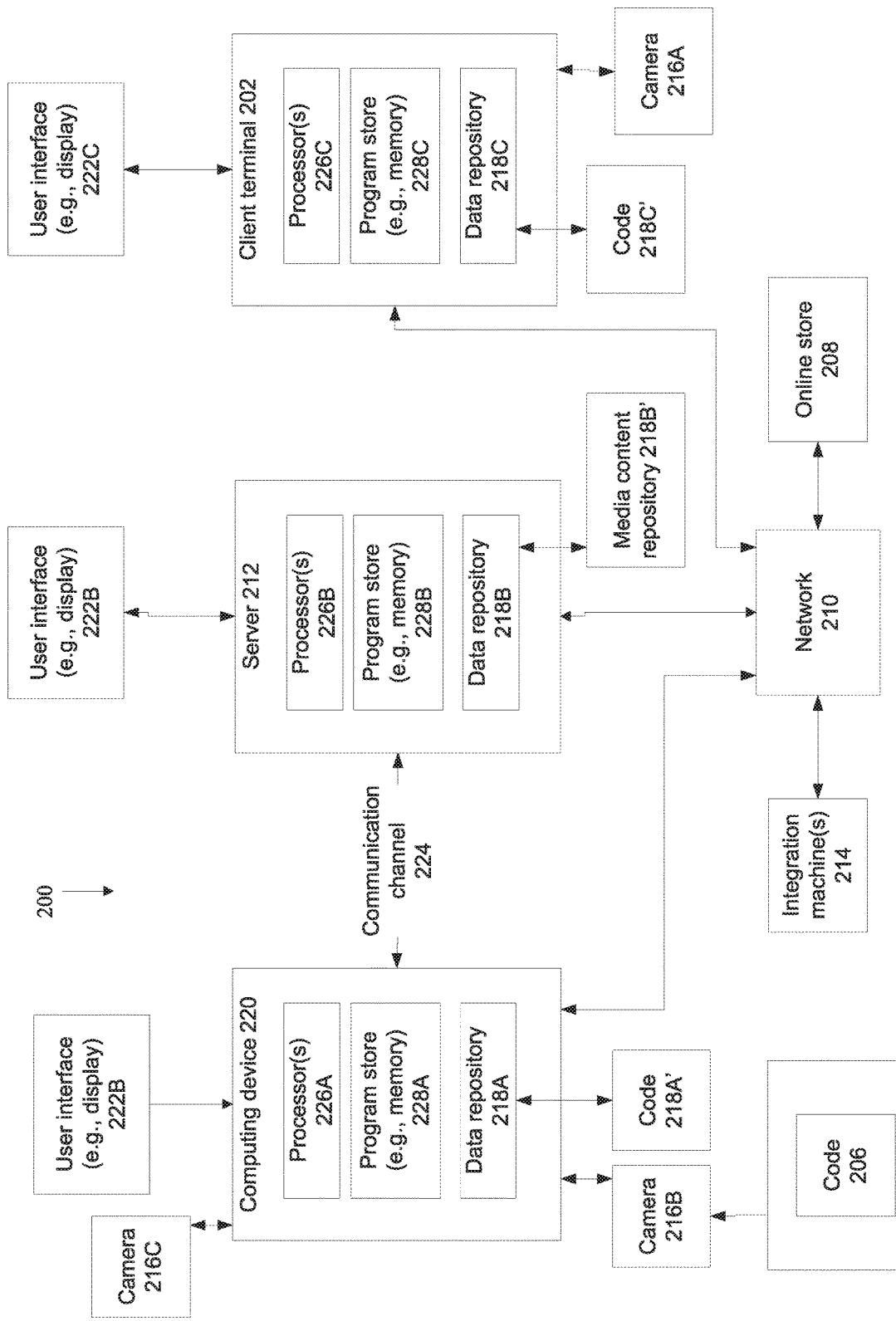
FIG. 2 is a block diagram of components of a system for establishing a communication channel between a receiver side, denoted herein as a computing device, and a sending side, denoted herein as a server and/or a client terminal, in accordance with some embodiments of the present invention.

Reference is now made to FIG. 1, which is a flowchart of a process of establishing a communication channel over a network between a receiver side and a sending side based on a code integrated within an adornment, in accordance with some embodiments of the present invention. Reference is also made to FIG. 2, which is a block diagram of components of a system 200 for establishing a communication channel 224 between a receiver side, denoted herein as a computing device 220, and a sending side, denoted herein as a server 212 and/or a client terminal 202, in accordance with some embodiments of the present invention. One or more acts of the method described with reference to FIG. 1 may be implemented as code instructions stored in a data storage device executed by one or more processors at the sending side and/or receiving side. Acts 102-106 are executed with respect to the sending side. Act 108 denotes the interaction between the sending side and the receiving side. Acts 110-114 are executed with respect to the receiving side.

In summary, client terminal 202 (e.g., running a graphical user interface (GUI)) may be used by a user to select an adornment 204 having a code 206 integrated therein. Adornment 204 may be purchased from an online store 208 and/or server 212 accessed by client terminal 202 over a network 210. Code 206 may be automatically generated by server 212 and optionally automatically integrated by an integration machine 214 and/or manually by a human based on instructions presented on a display, for example, by etching, engraving, hallmarking, and inlaying of precious stores. Server 212 receives one or more media content items from client terminal 202 over network 210, for example, videos and/or images captured by a camera 216A. The media content items are associated with code 206 by server 212 and stored in a media content repository 218B'. Adornment 204 is provided to a receiving user, for example, shipped by online store 208 to the address of the receiving user provided by the sending user of client terminal 202. Computing device 220, which is used by the receiving user, captures an image of code 206 using a camera 216B. A communication channel 224 is established between computing device 220 and server 212 (and/or client terminal 202). The media content items provided by client terminal 202 are transmitted over communication channel 224 and presented on a display 222A of computing device 220. Computing device 220 may communicate with client terminal 202 over network 210 using established communication channel 224. Optionally a GUI executing on computing device 220 facilitates providing a response to the viewing of the media content item(s) to client terminal 202 via communication channel 224, for example, a chat session and/or an image of the receiving user viewing the media content item(s).

Server 212 may be implemented as, for example, a network server, software loaded on an existing network device, and a computing cloud.

Client terminal 202 and/or computing device 220 may be implemented as, for example, a mobile device, a desktop computer, a thin client, a Smartphone, a Tablet computer, a laptop computer, a wearable computer, glasses computer, and a watch computer.

Server 212 provides services to client terminal 202 and/or computing device 220, for example, by providing code instructions (e.g., App) that is downloaded to client terminal 202 and/or computing cloud 220, and/or providing features that are remotely accessed by client terminal 202 and/or computing cloud 220 for example, using a remote access session and/or web browser and/or the downloaded code instructions.

Processor 226A (of computing device 220) and/or processor 226B (of server 212) and/or processor 226C (of client terminal 202) may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 226A-C may include one or more processors (homogenous or heterogeneous), which may be arranged for parallel processing, as clusters and/or as one or more multi core processing units.

Storage device 228A (of computing device 220) and/or storage device 228B (of server 212) and/or storage device 228C (of client terminal 202) store code instructions implementable by respective processor(s) 226A-C may be implemented, for example, as for example, non-volatile memory, magnetic media, semiconductor memory devices, hard drive, removable storage, and optical media (e.g., DVD, CD-ROM).

Data repository 218A (of computing device 220) and/or data repository 218B (of server 212) and/or data repository 218C (of client terminal 202) store code 218A' and/or 218C' received from server 212, and may be implemented as, for example, a memory, a local hard-drive, a removable storage unit, an optical disk, a storage device, and/or as a remote server and/or computing cloud (e.g., accessed via a network connection).

User interface 222A (of computing device 220) and/or user interface 222B (of server 212) and/or user interface 222C (of client terminal 202) includes a mechanism for a user to enter data (e.g., define the video and/or image to transmit) and/or view presented data (e.g., the transmitted video and/or image). Exemplary user interfaces 222A-C include, for example, one or more of, a touchscreen, a display, a keyboard, a mouse, and voice activated software using speakers and microphone.

Network 210 may include, for example, the Internet, a local area network, a virtual private network, a cellular network, and/or a wireless network.

Cameras 216A-C may be implemented as, for example, a digital camera capturing still images, and/or a video camera capturing videos. Cameras 216A-C may captures images in color (e.g., when colored gems denote the encoded identifier) or black and white. Alternatively or additionally, other imaging devices may be used, for example, a laser imaging sensor, a scanning sensor, or other devices.

Referring now back to FIG. 1, at 102, machine readable code 206 that encodes an identifier for establishing the communication channel is integrated with adornment 204. Communication channel 224 is established over network 210 between computing device 220 that captures the image of code 206 using camera 216B, and server 212 and/or client terminal 202 that defines the communication channel 224, as described herein.

Adornment 204 includes an adornment body that is sized and shaped for wearing on an appendage of the body of a human, for example, a ring, an earring, a nose ring, a toe ring, a bracelet, an anklet, a necklace, and a crown.

Each adornment 204 is integrated with code 206, where code 206 is un-separable from adornment 204 without damaging adornment 204 and/or without removing a portion of adornment 204 together with code 206. For example, in contrast to a sticker and/or ink printed on the surface of the adornment. Code 206 may represented a decorative portion of adornment 204, designed both for visual enhancement of adornment 204 and for establishing communication channel 224. For example, a viewer looking at adornment 204 may not be able to discriminate between code 206 and the other decorations of adornment 204.

Code 206 may be defined by a pattern, which may include one or more of the following:

A binary pattern, for example, the presence or absence of an element, for example, a diamond or other precious stone.

One or more symbols.

The overall shape of code 206 and/or the shape of each element defining code 206 may be implemented as, for example, a circle, a triangle, a sharp square, a rounded square, a rectangle, an oval, a diamond shape, a hexagon, an irregular outline, or other geometrical shapes.

Code 206 may be implemented as one or more rows of elements, for example, three rows of a possible total of ten elements in each row.

Code 206 may be implemented as one or more dimensions, for example, one dimension denoting a binary linear pattern, two dimensions denoting a surface pattern, another dimension denoted by color of the gems, and yet another dimension denoted by the shape of each gem. The elements may be processed as linear arrays (e.g., each row an array), or a two dimensional matrix, or higher dimensions (e.g., the third or higher dimension is based on another feature, for example, color, shape, type of stone, and relative size of the element).

Encoding according to colors of the gems.

Encoding according to the shape of each gem.

The code integrated with the adornment does not conform to QR code formats.

Each element of the code may be spaced apart from its neighbor.

Each element of the code may be a certain size.

Figure 6:
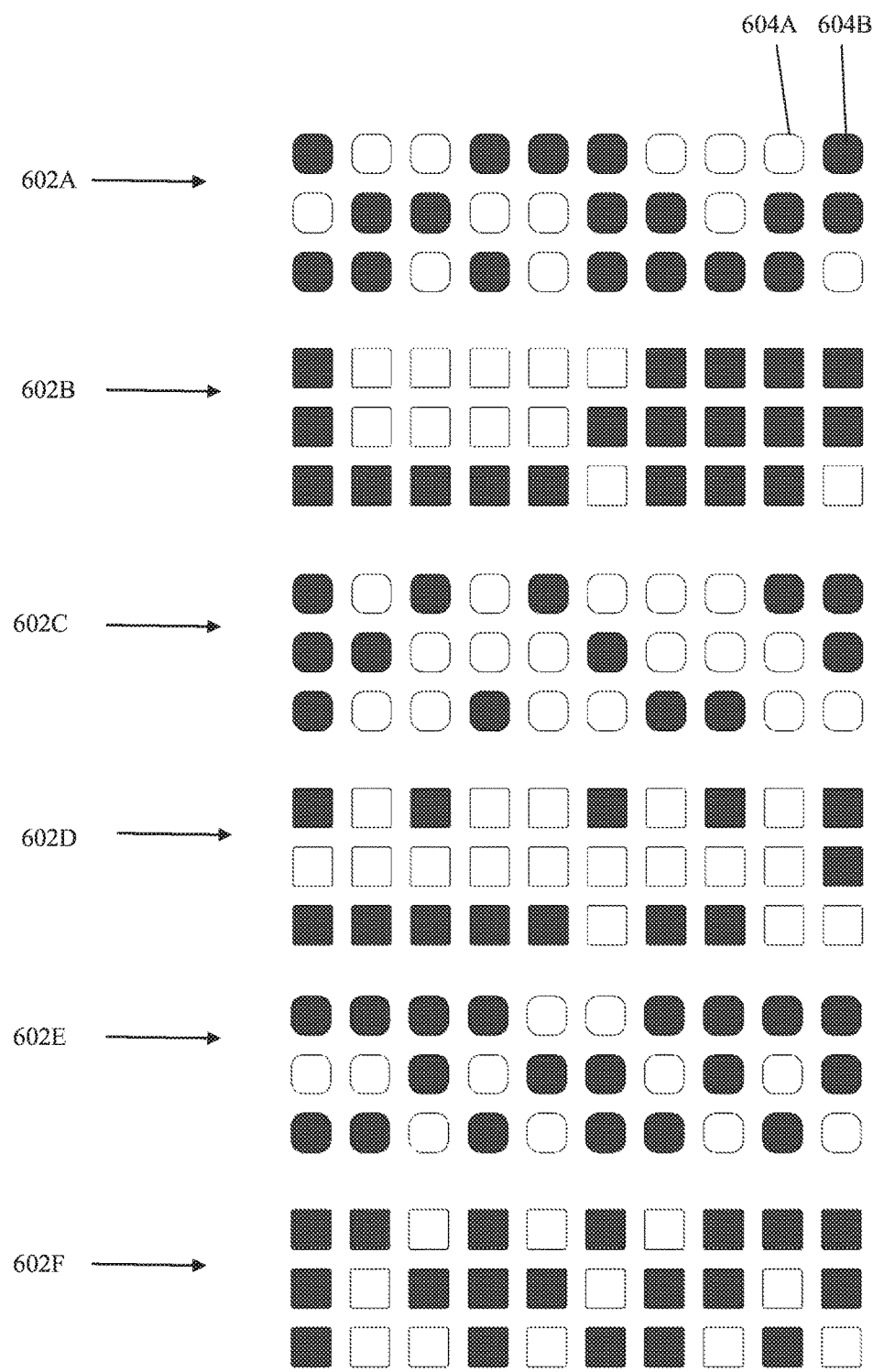
FIG. 6 is a schematic depicting exemplary codes integrated with an adornment, in accordance with some embodiments of the present invention.

Reference is now made to FIG. 6, which is a schematic depicting exemplary codes integrated with an adornment, in accordance with some embodiments of the present invention. Codes 602A-F are based on a sequence of elements, arranged in three rows of ten elements each. The elements are spaced apart from one another. Each element denotes a binary value, for example, element 604A denotes a first value (e.g., including a light colored stone, or the background metal color), and element 604B denotes a second value (e.g., including a dark colored stone, an engraving, a depression). Each element of respective codes 602A-F is based on a certain shape common to the elements of the respective code. Code 602A denotes an example of round square shaped elements forming the code. Code 602B denotes an example of sharp square shaped elements forming the code. Code 602C denotes another example of round square shaped elements forming the code. Code 602D denotes another example of sharp square shaped elements forming the code. Code 602E denotes another example of round square shaped elements forming the code. Code 602F denotes another example of sharp square shaped elements forming the code.

Referring now back to act 102 of FIG. 1, exemplary methods of integrating code 206 with adornment 204 include:

Inlaying with precious stones and/or gems, for example, diamonds, rubies, sapphire and emeralds (and/or mimics of the precious stones and/or gems, for example, quartz, crystals, low quality diamonds). The gems are inlaid according to the code, and provide an ornamental pattern and/or visually pleasing appearance. The inlaying may be performed using synthetic materials that mimic gems and/or precious stones, for example, quartz, and plastic. The inlaying may be performed using precious metals, for example, yellow gold, white gold, red gold, platinum, and silver.

Engraving the code within the surface of the adornment. The engraving may be performed on an exterior surface of the adornment as a visually enhancing effect, or in an inner surface that is placed against the body of the person wearing the adornment.

The code may be applied as a hallmark the exterior surface of the adornment as a visually enhancing effect, or in an inner surface that is placed against the body of the person wearing the adornment. The hallmark may be applied with, for example, a punching process, and/or a laser marking process.

The code may be applied as a depression, indentation, or aperture (i.e. hole) through the thickness of the adornment.

Figure 7:
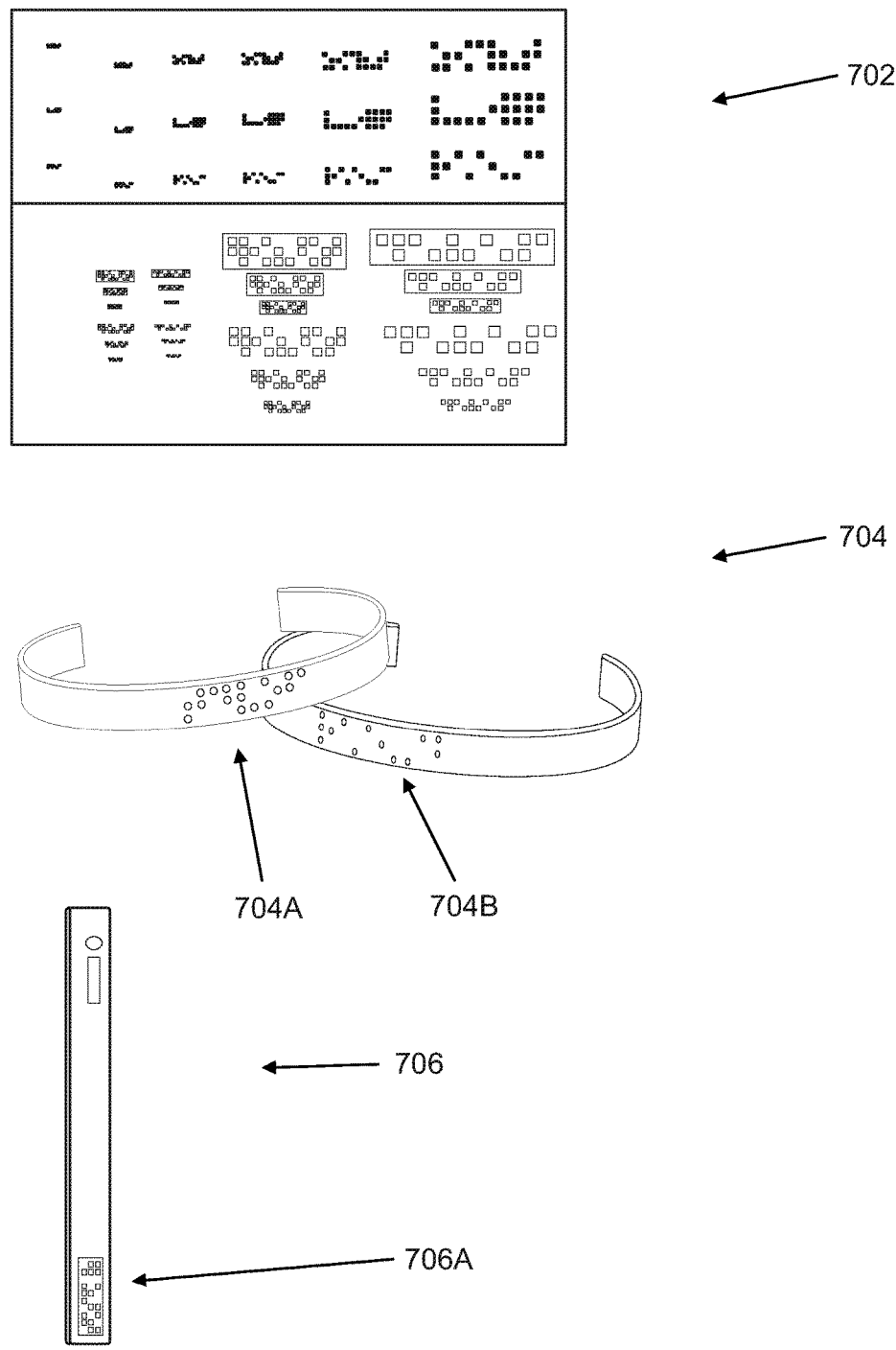
FIG. 7 is set of images of exemplary adornments having codes integrated therein, in accordance with some embodiments of the present invention.
Figure 7:
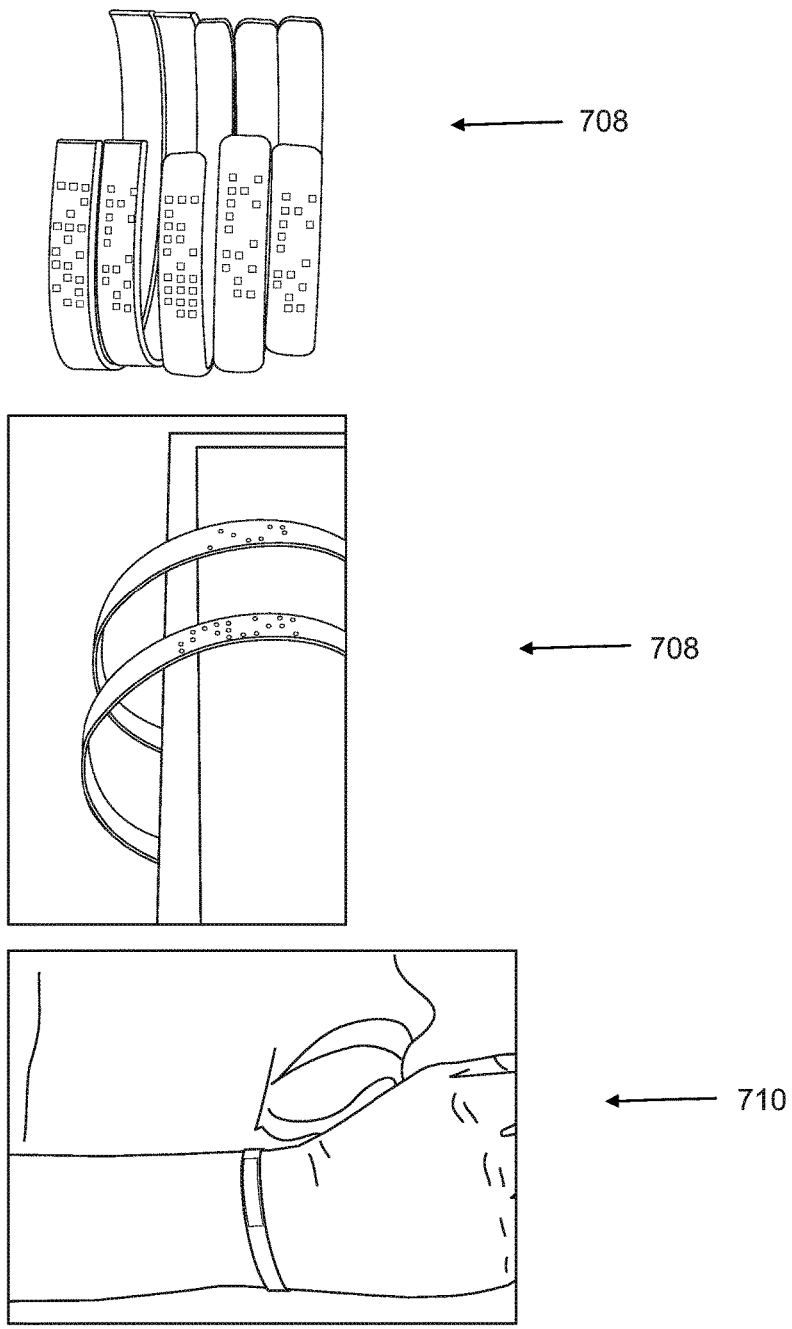

Reference is now made to FIG. 7, which includes images of exemplary adornments having codes integrated therein, in accordance with some embodiments of the present invention. 702 depicts an example of codes formed on gold metal, where an element denote a binary value, either marked as a dark color (e.g., engraving, depression, laser printed, another metal welded on the gold) or left empty (i.e., the background gold color). Codes may be of different sized elements. 704 depicts a bracelet with code 704A formed by depressions or apertures through the bracelet, and code 704B formed by inlaying of diamonds (or quartz, or crystal, or other precious stones). 706 depicts a bracelet with code 706A based on one of the codes described with reference to 702, for example, hallmarked, engraved, or laser printed therein. 708 depicts a front view of bracelets made from different metals (e.g., white gold, yellow gold, and red gold), with codes formed by depressions or apertures through the thickness of the metal. 708 depicts a side view of a bracelet with code formed by inlaying of stones. 710 depicts a view of a bracelet with code formed by inlaying of stones worn on a wrist.

Referring now back to act 102 of FIG. 1, optionally, the portion of the adornment (e.g., adornment body) that has the code integrated therein (e.g., inlaid, engraved, hallmarked) includes two or more parts that are designed to connect with one another. Each of the parts includes at least a part of the code. When the parts are connected, the code is whole. The identifier encoded by the machine readable code is obtainable when the parts are connected. For example, the code may be inlaid using diamonds on a heart that is divisible into two halves. Each half includes some of the diamonds. When the complete heart is formed by connecting the two halves, the machine readable code may be imaged and the encoded identified extracted for establishing the communication channel.

Optionally, each adornment includes a unique pre-set code. The codes may be automatically generated, for example, based on code instructions executed by processor(s) of a code server. Each automatically generated code may be integrated with the respective adornment, before the adornments are made available to the public, optionally before the adornments are sold. The pre-set unique code of the certain selected adornment is then mapped to the media content item(s) designated for transmission over the communication channel, for example, after a user selects the certain adornment and provides the media content item(s).

Alternatively or additionally, the code is automatically generated after each certain adornment is selected. The generated code is integrated with the adornment after generation of the code and after selection of the adornment, optionally by integration machine 214. The code is integrated with an adornment that does not yet include the code. The code may be integrated at a defined region of the adornment, optionally a smooth surface sized and shaped for modification for reception of the adornment. For example, after a user selects to purchase the adornment, the code is inlaid and/or hallmarked on the adornment before delivery to the end recipient. Optionally, the code is automatically generated by a security server. The code may serve as a decryption key for decryption of associated media content item(s). In such a case, the code is optionally generated in response to encryption of the media content item(s) designated for transmission over the communication channel.

The certain adornment may be purchased by a sending user, for example, at an online store 208 (e.g., using a GUI that presents available adornments), and/or at a physical retail outlet. Online store 208 may communicate with server 212, for example, using a software interface (e.g., application programming interface, software development kit), and/or may online store 208 may be integrated with server 212.

At 104, communication channel 224 is defined. Communication channel 224 is defined based on data provided by the sending user, which may be the same user that selects the adornment. The data for defining communication channel 224 may be provided by the sending user as part of the purchasing process of adornment 204, for example, after selection of the adornment the user is prompted by the GUI to provide the data defining communication channel 224. Alternatively or additionally, the sending user may provided the data to define communication channel 224 and/or provide additional data after the purchase, for example, before and/or after the receiving user received adornment 204.

One or more of the following parameters provided by the sending user define communication channel 224. The parameters may be implemented as a set-of-rules that define the establishment of communication channel 224. The values of the parameters and/or data may be provided by client terminal 202, and stored by server 212, for example, in media content repository 218B'. Optionally, code 218C' is downloaded from server 212, stored on client terminal 202, and executed by processor(s) 226C of client terminal 202.

The sending user may use code 218C' to provide the data to server 212 and/or define the parameters of the communication channel.

Media content item(s) to transmit to computing device 220 over the communication channel established according to the captured image of code 206 of adornment 204, for example, a video, an image, an audio file, an a text message.

A certain computing device(s) that is authorized to transmit and/or receive data over the communication channel. The computing device(s) may be identified, for example, using a phone number of a mobile device implementation of the computing device, a network address, and/or other methods.

A certain user(s) that is authorized to transmit and/or receive data over the communication channel. The certain user(s) may be identified, for example, by entering private information (e.g., birthday), logging into a secure site, a phone number, and/or other methods. It is noted that the sending user is automatically designated as authorized to transmit and/or receive data over the communication channel.

Encryption of the data transmitted over the communication channel, for example, the media content item(s).

Whether the GUI facilitates providing a response to the viewing of the media content item(s) on computing device 220. The response mechanism may be defined as a chat session that automatically activates upon viewing of the media content item(s) and/or upon imaging of the code. When the chat session is activated, the members that are authorized to chat with the user of computing device 220 are added according to the definition.

Whether the communication channel is one way or two ways. The one way option transmits media content item(s) and/or other data from server 212 to computing device 220. The two way option transmits data from computing device 220 to server 212 and/or to client terminal 202, for example, a chat session, and/or transmitting a video of the recipient user receiving adornment 204.

Whether to enable a reaction feature. The reaction feature is designed to capture the reaction of the receiving user. The reaction feature is triggered, in response to the receiving user capturing the image of code 206 and/or viewing the designated media content item(s) stored on server 212. The reaction feature includes capturing one or more images (e.g., still images or video) by another camera 216C (or common camera 216B used to capture the image of code 206) of computing device 220. Camera 216C is positioned for capturing the face of the receiving user. The image(s) are of the face of the receiving user are captured when the receiving user is capturing the image of code 206 and/or when the receiving user is viewing the media content items transmitted over the communication channel. The image(s) of the face of the receiving user are transmitted to client terminal 202 of the sending user and/or stored on server 212 with access authorization provided to sending user of client terminal 202.

Client terminal 202 may access server 212 to modify, remove, and/or add one or more media content items.

Optionally, one or more of the following rules of the set-of-rules are defined. The rules may be defined for establishment of the communication channel. Alternatively or additionally, the rules may be defined for transmission and/or automatic presentation of selected media content item(s) over the established communication channel. Exemplary rules include:

Time based rules. Access to the media content item(s), presentation of selected media content item(s), and/or establishment of the communication channel may be performed according to a defined time and/or date requirement, optionally for a future time and/or date. For example, the sending user defines that the communication channel may only be established on a wedding anniversary. In another example, a father defines a series of videos for automatic presentation on future birthdays of a child, each video is selected for automatic presentation on a different future birthday.

Location based rules according to the geographical location of the computing device of the receiving user, obtained for example, from a global positioning system (GPS) device of the computing device. Access to the media content item(s), presentation of selected media content item(s), and/or establishment of the communication channel may be performed according to a defined geographical location requirement. For example, the communication channel is established only when the mobile device of the receiving user is located within the house of the receiving user (e.g., for private viewing of the videos). In another example, respective videos are defined to automatically play on the screen of the mobile device of the receiving user at designated locations. For example, when the mobile device is located at a restaurant, a park, or a movie theater where the sending and receiving user went on dates, a video that is designated for each location is played relaying a memory of the date at the location.

Proximity based rules according to the proximity of the computing device of the receiving user to another defined computing device, optionally the client terminal of the sending user. Access to the media content item(s), presentation of selected media content item(s), and/or establishment of the communication channel may be performed according to a defined proximity requirement. For example, the video is automatically played on the display of the computing device of the receiving user when the computing device of the receiving user is in proximity to the client terminal of the sending user. Proximity may be sensed, for example, using short range radio communication protocols.

At 106, the media content item(s) provided by sending user and/or client terminal 202, and/or the parameters defining the communication channel are mapped to a certain code (and/or to the indication encoded by the code) integrated with adornment 204 by server 212. The mapping may be stored, for example, in a mapping dataset. The mapping may be performed by mapping the pre-set code (and/or indication encoded by the code) of the selected adornment to the media content item(s) and/or parameters. Alternatively or additionally, the code is generated in response to the definition of the parameters and/or uploading of media content item(s) to server 212. The generated code is then integrated within the selected adornment.

At 108, adornment 204 with integrated code 206 is provided to the receiving user, for example, shipped from a physical warehouse associated with online store 208 to the geographical address of the receiving user.

Computing device 220 of receiving user may download code 218A' from server 212, for local storage in data repository 218A and/or program store (e.g., memory) 228A and execution by processor(s) 226A. Download of code 218A' may be triggered in response to a link transmitted to computing device 220 by client terminal 202 and/or server 212, for example, within an email, or a chat session, or as a pop-up message.

Optionally, the receiving user of computing device 220 may enter authentication credentials, as defined by the parameters of the communication channel. The authorized user may be mapped to the communication channel when the credentials are mapped to the authentication parameters associated with the communication channel, as described herein. The authentication credentials may be entered, for example, in order to download code 218A' from server 212, in response to capturing the image of code 206, to establish the communication channel, and/or to activate certain features of the communication channel (e.g., to transmit data). The authentication credentials may be entered using an interface (e.g., GUI) which may be implemented by code 218A', for example, At 110, an image of code 206 integrated with adornment 204 is captured by camera 216B of computing device 220. It is noted that other methods of imaging code 206 may be used, for example, laser scanning. The image may be captured using code 218A' received from server 212, executing on computing device 220, and/or may be captured using standard image capturing code and transmitted for analysis to server 212.

Instructions for capturing the image may be presented on display (e.g., 222A) of computing device 220.

The captured image and/or the code (optionally extracted from the captured image by code 218A') is transmitted to server 212.

Figure 3:
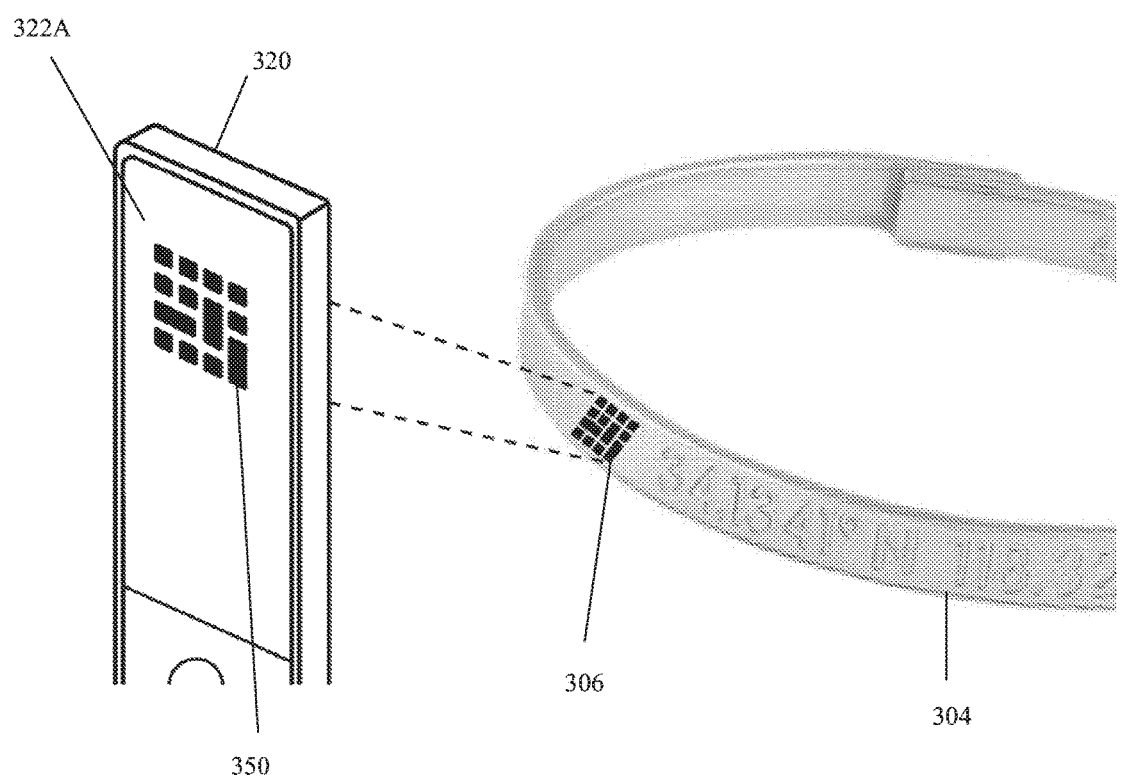
FIG. 3 is a schematic depicting capturing of an image of a code integrated with an adornment by a camera of a mobile device, in accordance with some embodiments of the present invention.

Reference is now made to FIG. 3, which is a schematic depicting capturing of an image 350 (shown on a display 322A) of a code 306 integrated with an adornment 304 (e.g., bracelet) by a camera of a mobile device 320, in accordance with some embodiments of the present invention.

Referring now back to FIG. 1, at 112, communication channel 224 is established between computing device 220 and server 212 over network 224 according to the code 206 captured in the image. Communication channel 224 may be established between computing device 220 and client terminal 202, optionally through server 212.

Communication channel 224 may be established by decoding code 206 (e.g., using code 218A') into a network address for accessing server 212, optionally for accessing the designated media content item(s).

Communication channel 224 is established according to the definitions provided by the sending user, as described herein.

Access to the media content item(s) stored on server 212 is granted to computing device 220 via communication channel 224.

At 114, data is transmitted over communication channel 224. Optionally, the designated media content item(s) stored in media content repository 218B' are transmitted over communication channel 224 to computing device 220 and presented on the associated display (e.g., 222A). The media content item(s) may be automatically presented on the display in response to imaging code 206 by camera 216B. The media content item(s) may be immediately presented, for example, the video is automatically and immediately played, accounting for delays due to processing resources and/or network resources.

The media content item(s) may be presented according to the definition and/or set-of-rules provided by the sending user, as described herein.

Optionally, communication channel 224 is authorized for access by computing device 220 and/or for access by the receiving user using computing device 220 prior to transmission of data and/or activation of features. A GUI (or other interface) may be presented on the display (e.g., 222C) of client terminal 202 with an indication that receiving user using computing device 220 is requesting to transmit data over the communication channel, optionally to download one or more media content items from server 212. The user of client terminal 202 may use the GUI to authorize the access to the media content item(s) and/or authorize data transmission and/or other features of the communication channel.

Optionally, code 206 serves as a decryption key for decrypting encrypted data transmitted over network 210 from server 212 and/or client terminal 202 to computing device 220 via communication channel 224. Alternatively or additionally, code 206 serves as an encryption key for encrypting data transmitted from computing device 220 to server 212 and/or client terminal 202 via communication channel 224.

At 116, a GUI (e.g. stored in code 218A') facilitating providing a response to viewing of the presented media content item(s) is presented on the display of computing device 220.

Optionally, the GUI triggers establishment of a chat session between GUI presented on display (e.g., 222A) of computing device 220 and an interface presented on display (e.g., 222C) of client terminal 202. Server 212 may establish the chat session according to the defined mapping stored by server 212.

Alternatively or additionally, the GUI activates camera 216C to capture one or more images of the face of the receiving user, in response to capturing the image of code 206 by camera 216B, and/or in response to viewing the media content items transmitted over communication channel 224. The image(s) captured by camera 216C are transmitted to server 212 and/or client terminal 202 over established communication channel 224.

Alternatively or additionally, the GUI facilitates providing other responses, which may be stored on server 212 and/or transmitted to client terminal 202, for example, an audio recording of the receiving user, and a text message written by the receiving user.

Various embodiments and aspects of the present invention as delineated hereinabove and as claimed in the claims section below find support in the following examples.

EXAMPLES

Reference is now made to the following examples, which together with the above descriptions illustrate some embodiments of the present invention in a non-limiting fashion. Reference is made to the method described with reference to FIG. 1 and/or system 200 described with reference to FIG. 2.

Danny and Jennifer get married. One year later, while looking for a romantic gift for the one year wedding anniversary, Danny access an online store (e.g., 208), and decides to buy a bracelet. During the checkout process, a new feature is presented, which allows Danny to add a virtual memory to the bracelet. Danny selects to add the memory. After purchase is confirmed, Danny receives a push notification and email with a link to download an app (e.g., code 218C' from server 212) where the memory may be uploaded to. Danny downloads the app to his mobile device (e.g., 202). Danny enters his phone number as a credential authorization using the interface (e.g., GUI) presented on the display (e.g., 222C) of his mobile device (e.g., 202). A code is presented within the GUI on the display, for account verification.

At 102, an image of the purchased bracelet is presented on the display (e.g., 222C) of the mobile device (e.g., 202). The code (e.g. 206) is shown on the image of the purchased bracelet. Alternatively, the image of the code does not yet appear.

At 104, Jennifer is mapped to the code as an authorized user.

At 106, Danny creates a video using the camera (e.g., 216A) of his mobile device (e.g., 202) at the place where he had his first date with Jennifer. Once Danny is satisfied with the video, the video is transmitted to server 212 for storage (e.g., in media content repository 218B'). The video is mapped to Jennifer as an authorized user to the code on the bracelet, defining the communication channel.

When the code is not pre-set, the code is integrated within the selected bracelet prior to shipping.

At 108, the bracelet with the integrated code arrives in the mail. Danny receives the package.

Danny captures an image of the code with camera (e.g., 216A) of his mobile device (e.g., 202). The communication channel (e.g., 224) between Danny's mobile device (e.g., 202) and the server (e.g., 212) storing the video recorded just a few days ago (e.g., in media content repository 218B') is established. The video is automatically transmitted over the established communication channel (e.g., 224) and presented on the display (e.g., 222C) of the mobile device (e.g., 202).

The day of the wedding anniversary arrives and Danny presents Jennifer with the bracelet as a gift. Danny shares the download link with Jennifer.

Jennifer downloads the app (e.g., code 218A') from server 212 to her mobile device (e.g., client terminal 220). The app may be downloaded from the shared link obtained from the short message service (SMS) transmitted from Danny's mobile device (e.g., 202), and/or following instructions provided on the attached gift card.

At 110, Jennifer captures an image of the code (e.g., 206) on the bracelet (e.g., 204) using the camera (e.g., 216B) of her mobile device (e.g., 220).

At 112, Jennifer waits for confirmation to see the video. Danny receives an SMS to confirm Jennifer's phone number, an authorize viewing of the video. Danny confirms the number. The communication channel is established.

At 114, the video recorded by Danny is automatically transmitted (e.g., from media content repository 218B') over network (e.g., 210) via the communication channel (e.g., 224) and presented on the display (e.g., 222A) of the mobile device (e.g., 220) of Jennifer. Jennifer watches the video and is thrilled with the present. A GUI appears on Jennifer's mobile device (220) presenting a chat session with Danny via Danny's mobile device (e.g. 202).

Figure 4:
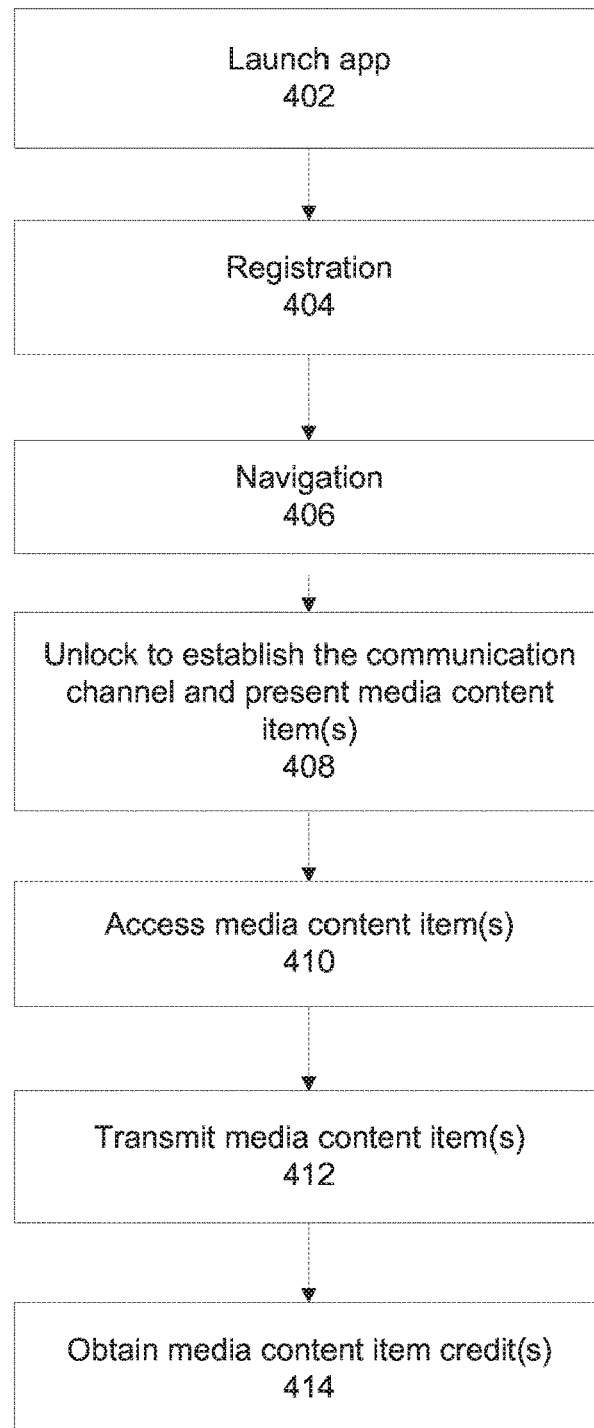
FIG. 4 is a flowchart of some possible exemplary and not necessarily limiting features associated with establishing the communication channel based on the code integrated with the adornment, in accordance with some embodiments of the present invention.

Reference is now made to FIG. 4, which is a flowchart of some possible exemplary and not necessarily limiting features associated with establishing the communication channel based on the code integrated with the adornment, in accordance with some embodiments of the present invention. The features described with reference to FIG. 4 may be implemented in association with one or more acts of the method described with reference to FIG. 1, and/or executed by one or more components of system 200 described with reference to FIG. 2.

At 402, an app downloaded to a mobile device is launched. The app 218A' and/or 218C' is downloaded, for example, from server 212 and loaded on client terminal 202 and/or computing device 220. The App may be launched from the background and/or from a close state. When launching the app the first screen to appear is the launch screen (termed splash). While in the launch screen the application may load first priority configurations (e.g., as supported application version, force update etc.) and performs the proper validations. When the mobile device is not yet verified, the launch screen may transition to show the Registration screen and continues with the registration flow. When the mobile device is verified, the launch screen may proceeds to present a loading indicator while loading relevant information from the server (application configuration, languages, and the like). After loading the information the app displays the Unlock Code screen.

Block 402 may be implemented by the sending user as described with reference to block 102 of FIG. 1 and/or the receiving user as described with reference to block 108 of FIG. 1.

At 404, each user is registered. In order to provide the user with a secured and quality experience the user is identified according to phone number of the mobile device and/or other personal credentials. Once the user is identified on a certain mobile device, the certain mobile device remains identified. The user may use the app until the user actively signs out of the app on the certain mobile device. In case of a stolen device the user calls a support line.

The registration screen may appear when the user opens the app from an inactive state or from the background and the mobile device is not identified. The registration screen may appear when the user actively signs out of the application, which is expected to be a very rare occasion.

The phone number field may be pre-populated with a + (plus sign) followed by the country code of the mobile device's known country according to the mobile device local. The user may edit the country code manually by inserting a different number. The user may enter up to 9 digits in the phone number filed, not including the country code. A continue button is enabled, despite that, upon clicking the continue button the app makes several internal validations. The app verifies that the existing country code is valid. The app may verify that the phone number is 9 digits in length or other relevant verifications. In case that the input did not pass internal validations an error is presented to the user below the relevant field. When the input is valid an API call is made to the server with the user's phone number and the app display a loading indicator until the API returns a response. When the API returns an error, the error message is displayed to the user. When the API returns successfully, the app automatically transition to the enter verification code screen.

The user may exit the verification code screen and go back to the enter your phone number screen. The user may able to enter, for example, up to 5 digits (and/or letters) in the verification code filed. The continue button is enabled, despite that, upon clicking the continue button the app makes several internal validations. The app verifies that the verification code is 5 digits (and/or letters) length. When the input does not pass internal validations an error message is presented to the user below the relevant field. When the input is valid, an API call is made to the server with the user's verification code and the app displays a loading indicator until the API returns a response. When the API returns an error, the error message is displayed to the user. When the API returns successfully, the app displays a loading screen. Upon finishing to load, the app starts.

Block 404 may be implemented by the sending user as described with reference to block 102 of FIG. 1 and/or the receiving user as described with reference to block 108 of FIG. 1.

Figure 5A:
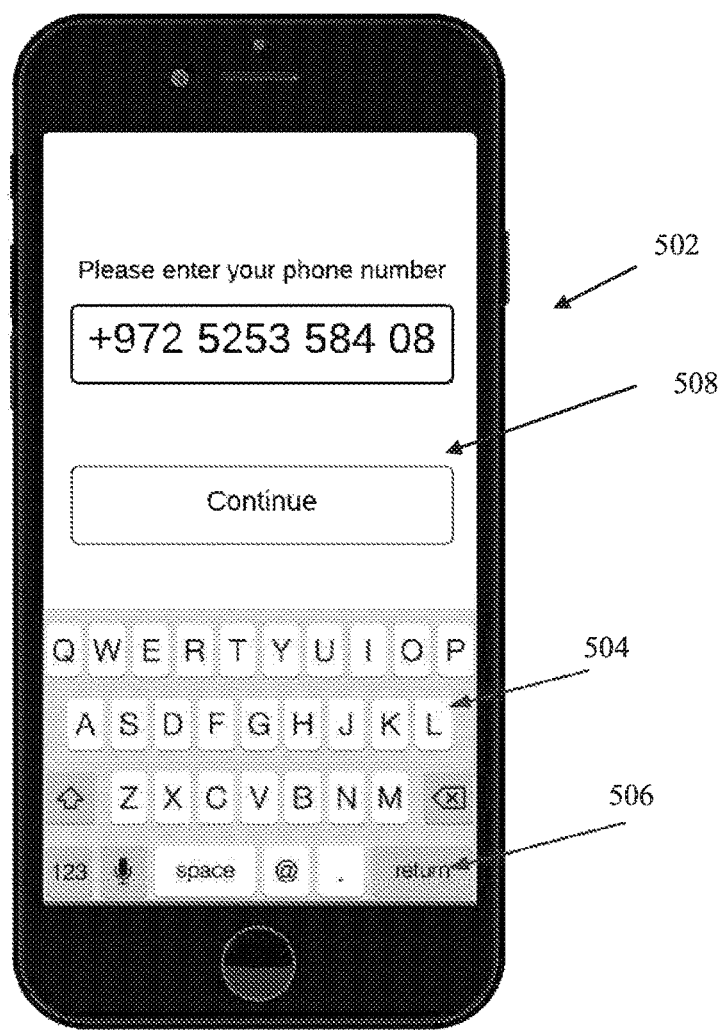

Reference is now made to FIG. 5A, which is a schematic of a mobile device 502 running the application for establishing the communication channel based on the code integrated with the adornment, in accordance with some embodiments of the present invention. The screen of mobile device 502 presents a GUI 508 during the registration process in which the user enters the phone number of the mobile device. Keyboard 504 may be substituted with a numerical pad. Return key 506 may be substituted with a continue button.

Figure 5B:
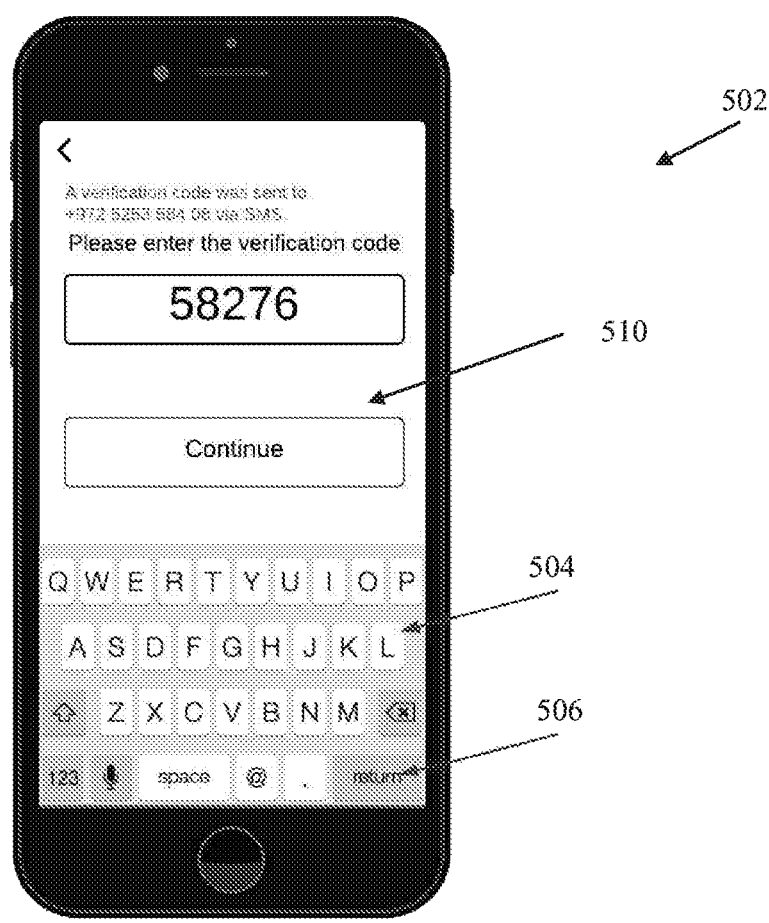

Reference is now made to FIG. 5B, which is another schematic of mobile device 502 running the application for establishing the communication channel based on the code integrated with the adornment, in accordance with some embodiments of the present invention. The screen of mobile device 502 presents a GUI 510 during the registration process in which the user enters the verification code transmitted via SMS.

Figure 5C:
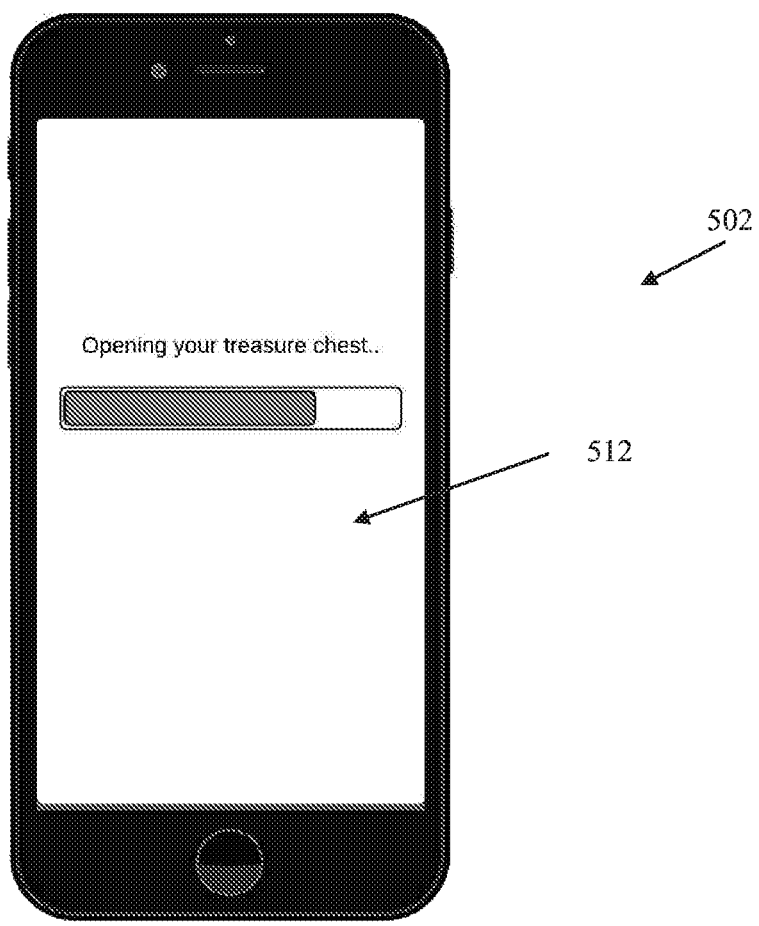

Reference is now made to FIG. 5C, which is yet another schematic of mobile device 502 running the application for establishing the communication channel based on the code integrated with the adornment, in accordance with some embodiments of the present invention. The screen of mobile device 502 presents a GUI 512 indicative of the establishment of the communication channel and transmission of the media content item(s) being accessed on server via the communication channel.

Referring now back to FIG. 4, at 406, the user navigates between the following exemplary main screens: unlock, treasure chest, send video, and my account.

The user may navigate between the main screens of the app using swipe gestures applied to a touchscreen. For example, in the Unlock screen: the user swipes from left→right to open the Treasure Chest screen coming from the right side. Swiping right→left opens the Send Video screen from the left side. Swiping top→bottom opens he My Account screen coming from the top. In the Treasure Chest screen the user swipes right→left to get back to the Unlock screen. In the Send Video screen the user swipes left→right to get back to the Unlock screen. In My Account screen, the user swipes bottom→top to get back to the Unlock screen.

Unlock, Treasure Chest and Send Video screens each include a bottom menu that has 2 buttons: one button to indicate the current screen and another button to reach the other screen available via swipe. The Unlock screen includes an additional button leading to the My Account screen. The My account screen includes a button leading to the Unlock screen.

Block 406 may be implemented by the sending user and/or the receiving user.

At 408, the app is unlocked. The Unlock code is triggered when the user launches the app on a verified mobile device. The unlocking triggers establishment of the communication channel and transmission of the media content item(s) (e.g., video) from the server for presentation on the display of the mobile device over the communication channel.

The unlock screen may appear after the splash screen when the user launches the app on a verified mobile device, or after the Registration flow when the user launches the app on an unverified mobile device, or when swiping/clicking the unlock button in the Treasure Chest and/or Send Video screens.

Upon presenting the Unlock screen for the first time, the application requests permission to access the mobile device's camera. When permission is granted, the application displays the scanning state of the unlock screen. When permission is not given (or denied while the application is in the background), the application displays a message to the user asking to enable permission to the camera for the app. During the scanning state, the Unlock screen may present a window with a live feed of the mobile device's video camera. The application analyzes the live feed to attempt to recognize a code until termination of the screen or success in scanning the code.

The application indicates to the user, optionally through visual effects, the effort and progress in recognizing a code in the live feed. When necessary, the application automatically turns on the flash to create better lightning conditions for scanning the code. The user may force the flash on or off. During manual user intervention selecting to change the state of the flash, the app does not interfere with the flash for the duration of the scan. The application indicates success of scanning the code to the user. When the scanned code is not associated with the mobile device, the application presents an error message to the user. When the code is associated with the mobile device, the Unlock screen transitions to present the video screen with the unlocked video playing (which is downloaded from the server over the established communication channel).

The Video screen may be presented in the loading state. The application continues to load and present the video.

Block 408 may be implemented, for example, by the receiving user as described with reference to blocks 110-114 of FIG. 1.

Figures 5D, 5E:
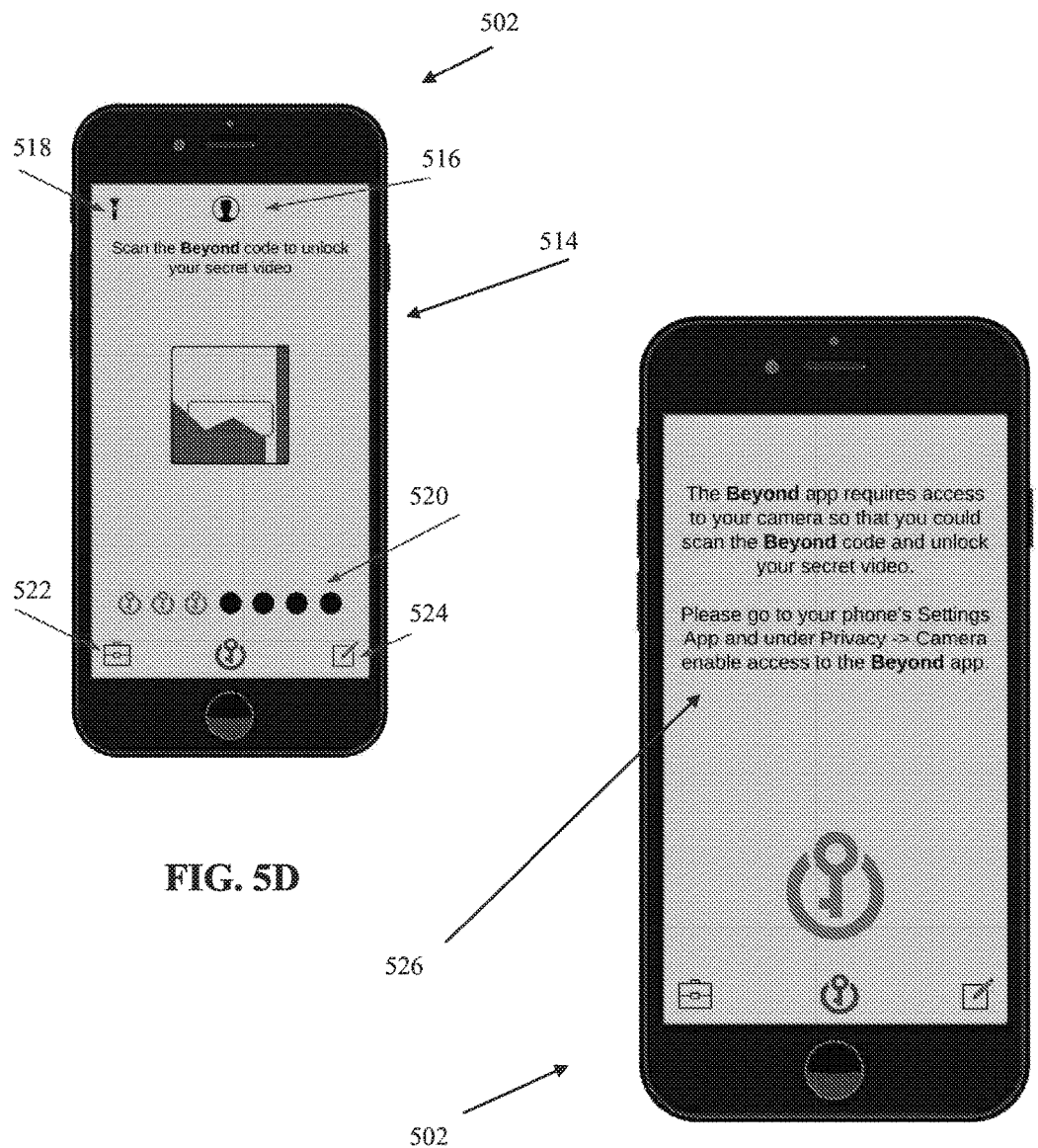
Figure 5K:
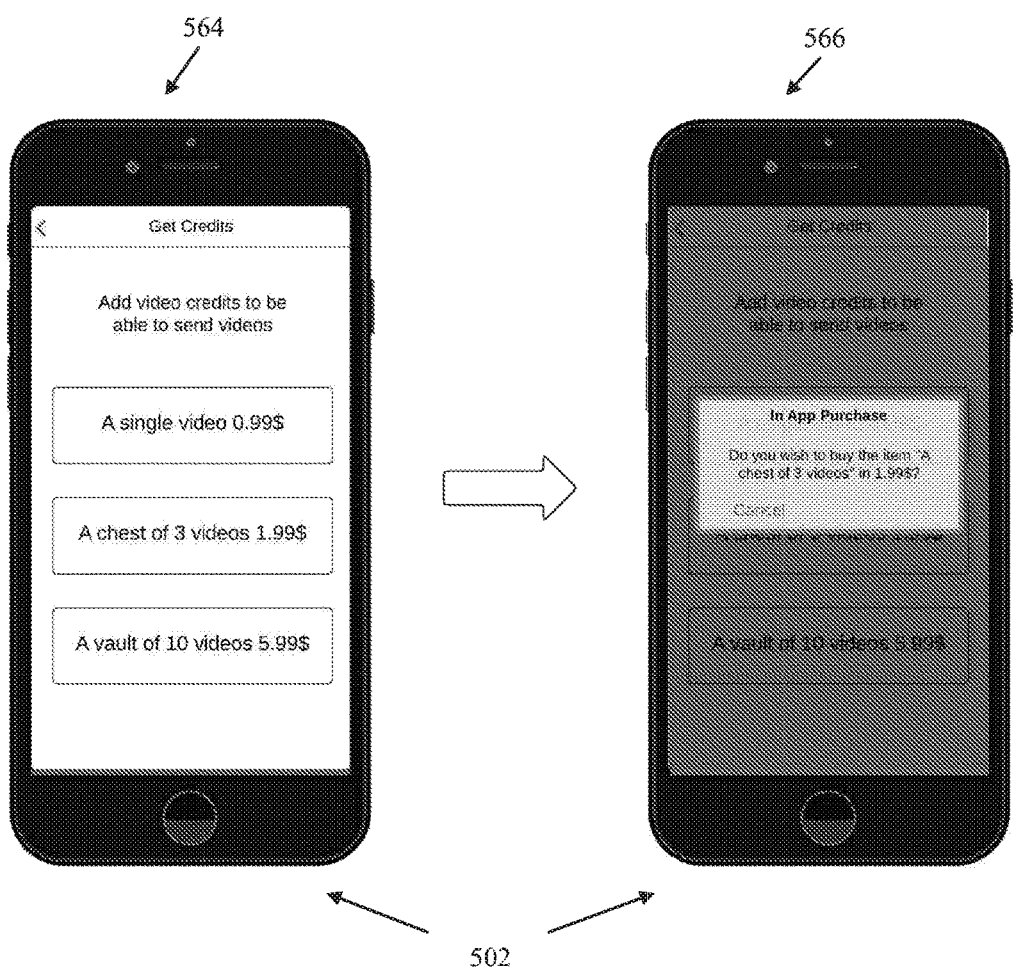

Reference is now made to FIG. 5D, which is yet another schematic of mobile device 502 running the application for establishing the communication channel based on the code integrated with the adornment, in accordance with some embodiments of the present invention. The screen of mobile device 502 presents a GUI 514 instructing the user to scan the code to establish the communication channel for unlocking the video.

Button 516 enters the Account screen. Button 518 turns the flash on or off. Button 520 denotes decryption of the video where the code denotes a decryption key. Button 522 enters the Treasure Chest screen. Button 524 transmits a video from the mobile device over the communication channel.

Reference is now made to FIG. 5E, which is yet another schematic of mobile device 502 running the application for establishing the communication channel based on the code integrated with the adornment, in accordance with some embodiments of the present invention. The screen of mobile device 502 presents a GUI 526 instructing the user to enable access to the camera for capturing the image of the code.

Returning now back to FIG. 4, at 410, the Treasure Chest is accessed over the established communication channel. The Treasure Chest stores the videos and/or other media content items of the user. The Treasure Chest is optionally hosted by server 212, for example, in media content repository 218B'.

The user may enter the Treasure Chest by navigating from the Unlock screen. The Treasure Chest includes the navigation model and a main display of the user's treasured videos. The user may be allowed only 1 video per adornment (e.g., jewelry), or other number of videos and/or media content items, for example, as defined by a policy and/or according to additional videos purchased by the user. When the user hasn't unlocked any code integrated with a jewelry item, a message appears promoting the user to unlock the code integrated with the jewelry item via the Unlock screen. When the user does not have any videos (known before the user unlocks the jewelry item) a message appears promoting the user to request videos from the sending user (alternatively, a promotional video is presented where a user records a video and another user scans the code on the bracelet to watch the video). When the user is associated with more than 1 video, the Treasure Chest screen is scrollable up and down.

Each video is tagged with a sender name, photo, date, time and duration. Clicking a video presents the Video screen with the selected video. The Video screen may include the native video player for the respective platform executing on the mobile device.

Block 410 may be implemented, for example, by the receiving user with reference to block 112 of FIG. 1

Reference is now made to FIG. 5F, which is yet another schematic of mobile device 502 running the application for establishing the communication channel based on the code integrated with the adornment, in accordance with some embodiments of the present invention. The screen of mobile device 502 presents a GUI 528 in which the video received from the server over the established communication channel is played. The phone number or the name of the sending user that provided the video is presented 530 in GUI 528. Menu 532 provide the option to go back to the Unlock screen or to go to the Send Video screen.

Reference is now made to FIG. 5G, which is yet another schematic of mobile device 502 running the application for establishing the communication channel based on the code integrated with the adornment, in accordance with some embodiments of the present invention. The screen of mobile device 502 presents a GUI 534 that includes a message or video indicating that there are no videos or media content items available for viewing.

Reference is now made to FIG. 5H, which is yet another schematic of mobile device 502 running the application for establishing the communication channel based on the code integrated with the adornment, in accordance with some embodiments of the present invention. The screen of mobile device 502 presents a GUI that includes a message 536 to unlock the jewelry item to view the video, and/or a message 538 to buy a jewelry item.

Referring now back to FIG. 4, at 412, a video or other media content item is sent by the sending user to the server for mapping to the code of the selected adornment. The video and/or media content items are presented to the receiving user when the receiving user captures the image of the code that establishes the communication channel.

Sending a video may be enabled by clicking the send video button in the bottom menu, or by swiping from one of the main screens, or by clicking the send a video hyperlink that appears in the Treasure Chest screen in the video-less state. Clicking send video presents the Send Video screen.

When the user first enters the Send Video screen, when the application does not have access to the user's camera, a message is presented asking for access to the camera of the mobile device. The user may select between the front and the back cameras (when available), and flash on or off. The user is promoted to record a video by long pressing the record button or taking a photo by short clicking the record button. The user uploads the video or the photo by clicking the upload button and selecting the video to upload to the server the gallery of videos stored on the mobile device. After taking or uploading the media content item, the user is transferred to the preview screen. In the preview screen the user may view and edit the media content item before sending. Clicking the X button cancels the selected media content item and goes back to the Video screen. Clicking the Send button transitions to the Select Recipient screen.

After clicking the Send button, when no video credits are left, the Add Video Credits flow described with reference to block 414 is triggered.

The user may view the possible recipients for receiving the provided media content item, which include the receiving user for whom the sending user purchased an adornment with code (e.g., jewelry item). Clicking a certain recipient triggers sending of the media content item and/or designation of the media content item to the communication channel established with the selected recipient. When an error occurs in the upload process, a message is displayed to the user with the option to try and upload the selected video again. When the upload is successful, the screen transitions to present a success message to the user, after which the screen may automatically transitions back to Unlock screen.

Block 412 may be implemented, for example, by the sending user as described with reference to blocks 104 and/or 106 of FIG. 1.

Reference is now made to FIG. 5I, which is yet another schematic of mobile device 502 running the application for establishing the communication channel based on the code integrated with the adornment, in accordance with some embodiments of the present invention. The screen of mobile device 502 presents a GUI 540 that provides the option to record a video or capture an image. When the recording is complete, GUI 542 provides the option to send the video or image to the server, for presentation on the mobile device of the receiving user when the communication channel is established based on the code of the adornment.

Button 544 toggles the flash on and off. Button 546 toggles between the front and back cameras. Button 548 selects full screen. Menu 550 includes a button to go back to the Unlock screen. Button 552 uploads the video or image from the gallery.

Bar 554 provides the option to add text or images. The video is played in a loop in box 556.

Reference is now made to FIG. 5I, which is yet another schematic of mobile device 502 running the application for establishing the communication channel based on the code integrated with the adornment, in accordance with some embodiments of the present invention. GUI 558 presents options of receiving users which the sending user selected the adornment with code). GUI 560 graphically depicts uploading of the video to the server. GUI 562 presents a message indicating that the video was uploaded successfully, and provides the option to upload another video or complete the process.

Referring now back to FIG. 4, at 414, additional video (or other media content item) credits are obtained. Video credits may be used to send videos using the app. Every video credit enables the sending user to send one video. The sending user may purchase a video credits bundle when purchasing jewelry at the online site or physical retail outlet, for example, by using the Account screen and selecting the Add Video Credits button or by trying to send a video while having no credits left.

The user may select from several bundles of video credits offering various discounts on the price per video. Clicking one of the bundles, the app contacts the App Store and a native purchase screen appears, asking the user to approve the purchase. When the user does not approve the purchase, an error message is displayed. When the user approves the purchase, a short animation is displayed and the previous screen is presented, i.e., Account or Send A Video screen.

Block 414 may be implemented, for example, by the sending user as described with reference to block 106 of FIG. 1, Reference is now made to FIG. 5I, which is yet another schematic of mobile device 502 running the application for establishing the communication channel based on the code integrated with the adornment, in accordance with some embodiments of the present invention. GUI 564 presents bundles of additional video credits. GUI 566 presents a message to confirm purchase of the selected bundle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant adornments, cameras, computing devices, and networks will be developed and the scope of the terms adornments, cameras, computing devices, and networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for establishing a communication channel between a computing device and a server storing at least one media content item over a network according to a code integrated with an adornment, comprising:
    a non-transitory memory having stored thereon a code for execution by at least one hardware processor of a computing device associated with a camera, the code comprising:
        code to capture an image of the code integrated with the adornment sized and shaped for wearing on an appendage of a body of a human, wherein the code encodes an identifier;
        code to establish a communication channel between the computing device and the server over the network according to the identifier;
        code to access at least one media content item mapped to the identifier, wherein the at least one media content item is received from the server via the communication channel and presented on a display of the computing device; and
    code to present a graphical user interface (GUI) on the display of the computing device that facilitates providing a response to viewing of the presented at least one media content item;
    wherein access to the at least one media content item is granted when a current date is according to a date requirement defined by a client terminal of a sending user that defines the establishment of the communication channel.

2. The system according to claim 1, wherein the at least one media content item is automatically transmitted from the server to the computing device via the established communication channel, and automatically presented on the display on the computing device substantially immediately upon imaging of the code, without additional input from the receiving user of the computing device.

3. The system according to claim 1, wherein the at least one media content item includes a video that is automatically streamed from the server via the established communication channel and automatically played on the display of the computing device substantially immediately upon imaging of the code, without additional input from the receiving user of the computing device.

4. The system according to claim 1, wherein the code denotes a decryption key for decrypting data transmitted over the network from the server to the computing device via the communication channel.

5. The system according to claim 1, wherein the code denotes an encryption key for encrypting data transmitted from the computing device to the server via the communication channel.

6. The system according to claim 1, wherein the code denotes a network address for accessing the server by the computing device.

7. The system according to claim 1, wherein the GUI facilitates a chat session between the computing device and a client terminal mapped to the identifier.

8. The system according to claim 1, wherein the code is automatically generated by a security server in response to at least one of: selection of a certain adornment, and definition of the communication channel, and wherein the automatically generated code is integrated with the selected certain adornment by an automated integration machine.

9. The system according to claim 1, wherein the GUI facilitates capture of at least one image by a second camera associated with the computing device, wherein the second camera is positioned for capturing the face of a user capturing the image of the code with the camera associated with the computing device; and
wherein the response comprises transmitting the at least one image captured by the second camera to the server over the established communication channel.

10. The system according to claim 1, wherein the at least one media content item is at least one of: modifiable, removable, and added, by a client terminal of a sending user that defines the establishment of the communication channel.

11. The system according to claim 1, wherein a certain recipient user is mapped to the identifier by a client terminal of a sending user that defines the establishment of the communication channel, and wherein access is granted to the at least one media content item when the certain recipient user is validated according to credentials entered using the GUI.

12. The system according to claim 1, wherein the code instructions are accessed by the computing device from the server according to a link transmitted to the computing device by a client terminal of a sending user that defines the establishment of the communication channel.

13. The system according to claim 1, wherein access to the at least one media content item is granted when an authorization is received from a client terminal of a sending user that defines the establishment of the communication channel.

14. The system according to claim 1, wherein access to the at least one media content item is granted when a geographical location of the computing device is according to a geographical location requirement defined by a client terminal of a sending user that defines the establishment of the communication channel.

15. The system according to claim 1, wherein access to the at least one media content item is granted when the computing device is in proximity to another designated computing device defined by a client terminal of a sending user that defines the establishment of the communication channel.

16. A method for establishing a communication channel between a computing device and a server over a network based on a code integrated with an adornment, comprising:
providing, by a client terminal of a sending user, at least one media content item for storage of a network connected server;
associating the at least one media content item with an identifier encoded by the code integrated with an adornment body sized and shaped for wearing on an appendage of a body of a human, imaging the code with a computing device;
establishing according to the identifier, a communication channel between the computing device and the server;
presenting the at least one media content item on a display associated with the computing device, wherein the at least one media content item is transmitted from the server to the computing device over the communication channel; and
providing a response to viewing of the presented at least one media content item, from the computing device to the client terminal of the sending user;
wherein access to the at least one media content item is granted when a current date is according to a date requirement defined by a client terminal of a sending user that defines the establishment of the communication channel.

17. The method according to claim 16, further comprising:
selecting the adornment from a plurality of adornments each including a body for integration of the code;
generating a unique version of the code for the selected adornment; and
at least one of: inlaying using a plurality of gems, engraving, and hallmarking the generated code within the body of the selected adornment.

18. The method according to claim 16, further comprising:
selecting the adornment from a plurality of adornments each including a respective pre-set code, wherein the associating of the at least one media content item is performed with the code of the selected adornment.

19. The method according to claim 16, further comprising:
defining by the client terminal of the sending user, a set-of-rules for establishment of the communication channel for presentation of the at least one media content item on the display.

20. The method according to claim 19, wherein the set-of-rules for establishment of the communication channel for presentation of the at least one media content item on the display include one or more members selected from the group consisting of: authorization of a receiving user, authorization of the computing device, a future date, a geographical location condition of the computing device, a time based condition, and a proximity of the computing device to another defined computing device.

* * * * *